(12) United States Patent
Arisawa et al.

(10) Patent No.: US 9,742,267 B2
(45) Date of Patent: Aug. 22, 2017

(54) POWER CONVERSION APPARATUS AND REFRIGERATION AIR-CONDITIONING APPARATUS

(71) Applicant: Mitsubishi Electric Corporation, Tokyo (JP)

(72) Inventors: Koichi Arisawa, Tokyo (JP); Takuya Shimomugi, Tokyo (JP); Takashi Yamakawa, Tokyo (JP); Keisuke Uemura, Tokyo (JP); Yosuke Shinomoto, Tokyo (JP); Kenta Yuasa, Tokyo (JP); Akihiro Tsumura, Tokyo (JP); Noriyuki Matsubara, Tokyo (JP); Shinsaku Kusube, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 49 days.

(21) Appl. No.: 14/781,606

(22) PCT Filed: Apr. 2, 2013

(86) PCT No.: PCT/JP2013/060092
§ 371 (c)(1),
(2) Date: Oct. 1, 2015

(87) PCT Pub. No.: WO2014/162519
PCT Pub. Date: Oct. 9, 2014

(65) Prior Publication Data
US 2016/0056715 A1    Feb. 25, 2016

(51) Int. Cl.
*H02M 3/158*    (2006.01)
*H02M 3/08*    (2006.01)
(Continued)

(52) U.S. Cl.
CPC ............... *H02M 3/08* (2013.01); *H02M 1/34* (2013.01); *H02M 3/156* (2013.01);
(Continued)

(58) Field of Classification Search
CPC . H02M 2001/0051; H02M 2001/0067; H02M 2001/0083; H02M 2003/1552; Y02B 70/1491; H02J 1/108
See application file for complete search history.

(56) References Cited

U.S. PATENT DOCUMENTS

2002/0097029 A1*  7/2002  Mantov ................... H02M 1/34
                                                              323/222
2004/0036451 A1*  2/2004  Itoh ....................... H02M 3/158
                                                              323/225
(Continued)

FOREIGN PATENT DOCUMENTS

JP    S59-117459 A    7/1984
JP    H08-126304 A    5/1996
(Continued)

OTHER PUBLICATIONS

International Search Report of the International Searching Authority mailed May 7, 2013 for the corresponding international application No. PCT/JP2013/060092 (and English translation).
(Continued)

*Primary Examiner* — Harry Behm
(74) *Attorney, Agent, or Firm* — Posz Law Group, PLC

(57) ABSTRACT

A power converter for converting electrical power from a power source to a load, including: a boosting device including a boost rectifier configured to prevent a backflow of a current from the load to the power source, the boosting device being configured to change a voltage of electrical power from the power source to a predetermined voltage; and a commutation device including: a commutation opera-
(Continued)

tion device configured to perform a commutation operation of directing a current flowing through the boosting device to an other path; and a commutation rectifier including a plurality of rectifiers and connected in series on the other path, the commutation rectifier being configured to rectify a current relating to commutation, thereby reducing a capacitance component.

17 Claims, 16 Drawing Sheets

(51) Int. Cl.
   *H02M 1/34* (2007.01)
   *H02M 3/156* (2006.01)
   *H02M 1/00* (2006.01)
(52) U.S. Cl.
   CPC ............... *H02M 2001/0051* (2013.01); *H02M 2001/346* (2013.01); *Y02B 70/1491* (2013.01)

(56) References Cited

U.S. PATENT DOCUMENTS

2006/0145674 A1* 7/2006 Shelton ............... H02M 1/4225
                                                              323/282

2015/0381072 A1* 12/2015 Sasaki ................... H02M 3/158
                                                              363/89

FOREIGN PATENT DOCUMENTS

| | | |
|---|---|---|
| JP | 2001-086747 A | 3/2001 |
| JP | 2002-010627 A | 1/2002 |
| JP | 2005-033881 A | 2/2005 |
| JP | 2005-160284 A | 6/2005 |
| JP | 2009-224956 A | 10/2009 |
| JP | 2012-070580 A | 4/2012 |
| JP | 2012-151942 A | 8/2012 |
| JP | 2012-231641 A | 11/2012 |
| JP | 2012-231646 A | 11/2012 |
| WO | 2012/042579 A1 | 4/2012 |
| WO | 2012/104889 A1 | 8/2012 |

OTHER PUBLICATIONS

Office Action issued Feb. 3, 2017 in the corresponding Chinese Patent Application No. 201380075088.7 (English translation attached).

* cited by examiner

F I G. 10
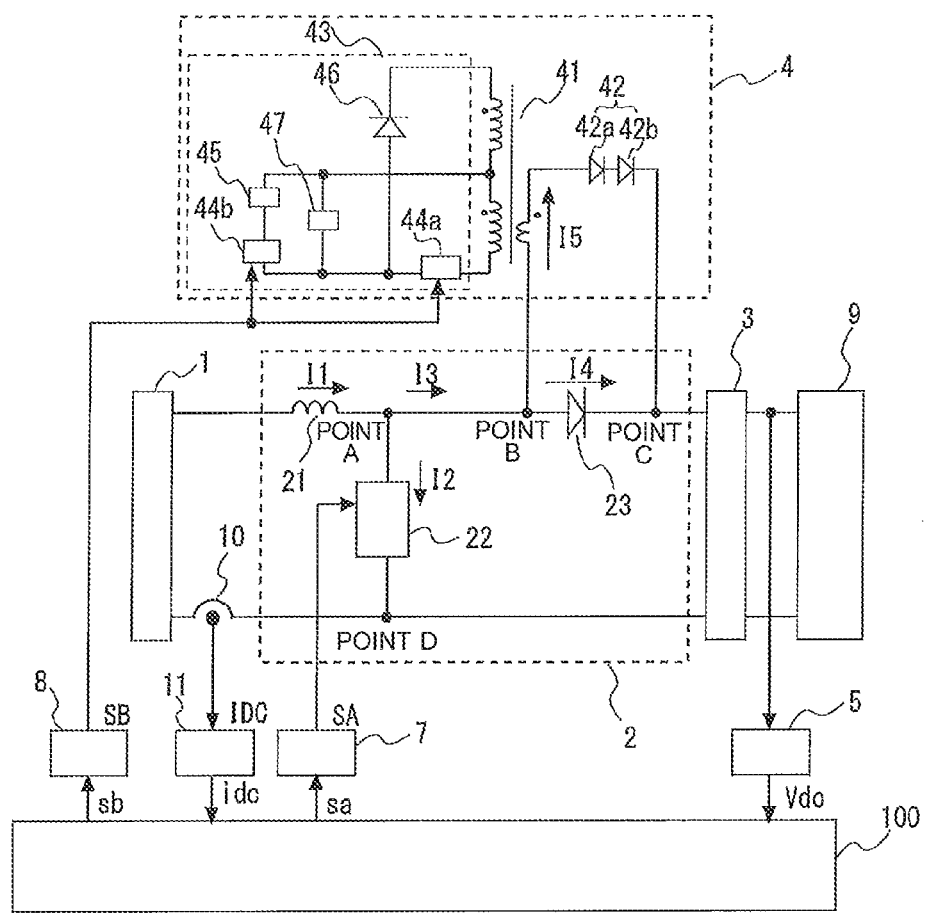

F I G. 1 3
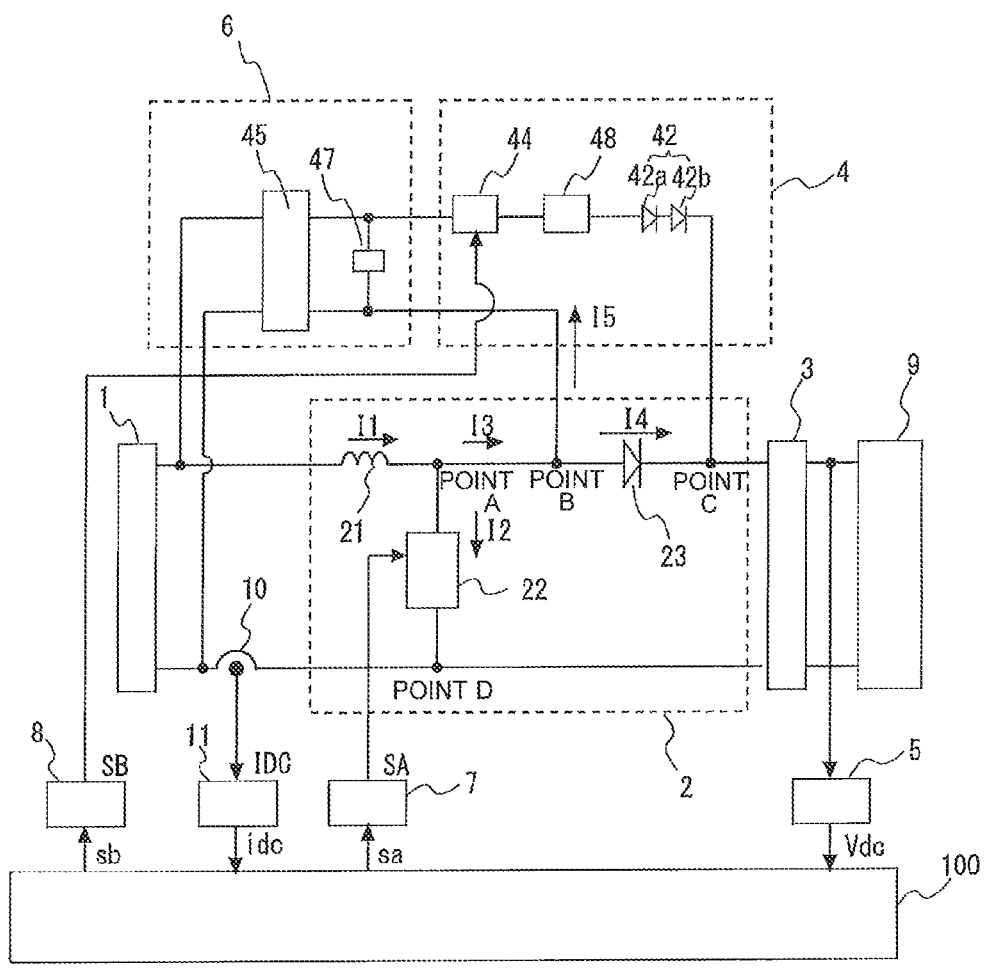

F I G. 1 4
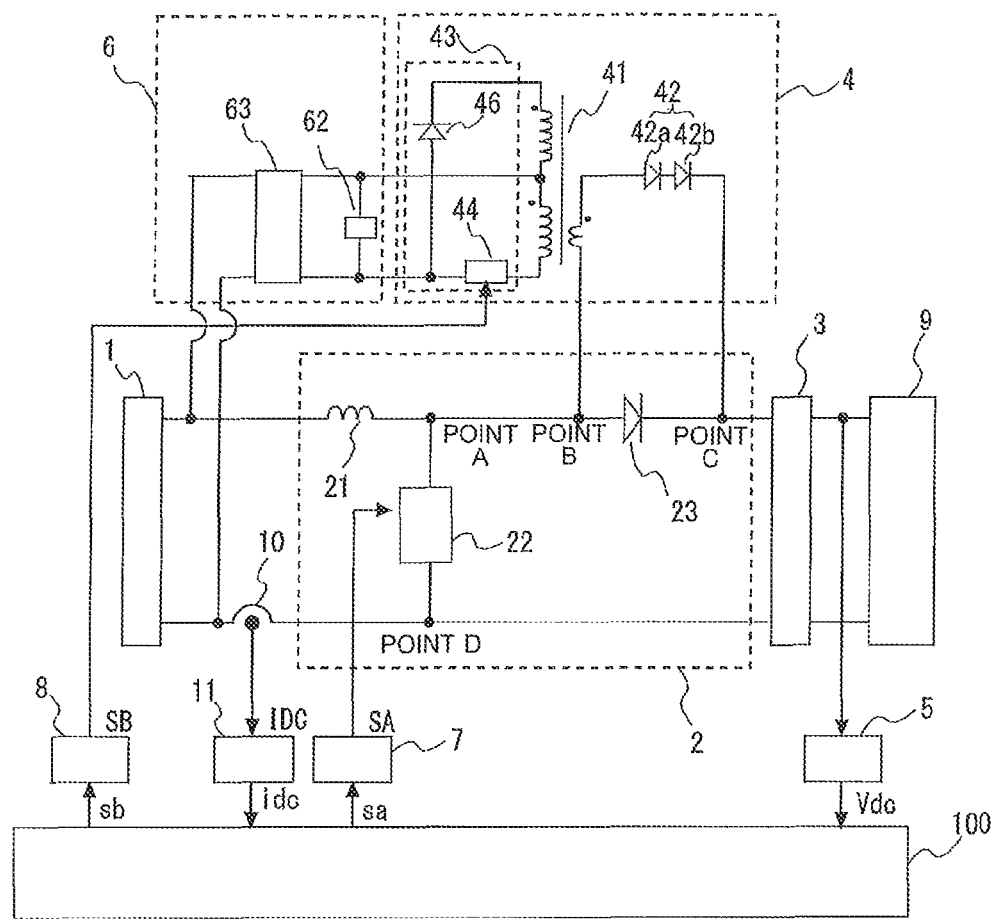

POWER CONVERSION APPARATUS AND REFRIGERATION AIR-CONDITIONING APPARATUS

CROSS REFERENCE TO RELATED APPLICATION

This application is a U.S. national stage application of International Application No. PCT/JP2013/060092 filed on Apr. 2, 2013, the disclosure of which is incorporated herein by reference.

TECHNICAL FIELD

The present invention relates to a power converter and a refrigeration air-conditioning apparatus.

BACKGROUND ART

Along with increased practical uses of variable voltage variable frequency inverter devices and other devices, application fields of various kinds of power converter have been developed.

For example, technologies applied to a boost/buck converter have been actively developed for a power converter in recent years. Meanwhile, wide band-gap semiconductor elements and other elements containing silicon carbide or other materials as its material have also been actively developed. In regard to such novel elements, elements having a high breakdown voltage but a small current capacity (permissible current effective value) have been put into practical use mainly for rectifiers (see, for example, Patent Literature 1).

CITATION LIST

Patent Literature

Patent Literature 1: Japanese Unexamined Patent Application Publication No. 2005-160284 (FIG. 1)

SUMMARY OF INVENTION

Technical Problem

Meanwhile, the practical use of novel highly efficient elements, such as elements having a large current capacity, is accompanied by a large number of challenges in terms of high cost, crystal defects, and other such problems, and it is considered that it will take some time before such elements become widespread. Accordingly, it is difficult at present to use such a novel element to achieve high efficiency of a power converter for converting electric power higher than electric power to be supplied to a motor, for example, of a compressor of an air-conditioning apparatus.

The present invention has been made in view of the above-mentioned problem, and provides a power converter and the like, which are capable of securing high efficiency, high reliability, and others. The present invention is also aimed at further reducing a loss due to power conversion.

Solution to Problem

According to one embodiment of the present invention, there is provided a power converter for converting electric power between a power source and a load, comprising: a voltage changing device including a rectifier configured to prevent a backflow of a current from a load to a power source, the voltage changing device being configured to change a voltage of electric power supplied from the power source to a predetermined voltage; and a commutation device including a commutation operation device configured to perform a commutation operation of directing a current flowing through the voltage changing device to an other path, and a commutation rectifier including a plurality of rectifiers connected in series on the other path, the commutation rectifier being configured to rectify a current related to commutation.

Advantageous Effects of Invention

According to the power converter in the one embodiment of the present invention, the commutation device capable of performing the commutation operation is provided, and hence the current flowing through the voltage changing device may be commutated to the other path. Consequently, for example, in the operation of the voltage changing device, a recovery current flowing from the load side (smoothing device side) to the voltage changing device side (power source side) may be reduced. At this time, because the plurality of rectifiers are connected in series to form the commutation rectifier, a combined capacitance component in the commutation rectifier may be small. Therefore, the capacitance component may be small even when the commutation rectifier is formed by inexpensive rectifiers, which may reduce reverse recovery time and suppress a recovery current at a low cost.

BRIEF DESCRIPTION OF DRAWINGS

FIG. 10 is a diagram illustrating a system configuration mainly including a power converter according to Embodiment 2 of the present invention.

FIG. 13 is a diagram illustrating a system configuration mainly including a power converter according to Embodiment 5 of the present invention.

FIG. 14 is a diagram illustrating a system configuration mainly including a power converter according to Embodiment 6 of the present invention.

DESCRIPTION OF EMBODIMENTS

Now, a power converter and the like according to embodiments of the present invention are described with reference to the drawings. In the following drawings, including FIG. 1, the same or corresponding parts are denoted by the same reference symbols, which is common to the entire contents of the following embodiments. Then, the modes of components described herein are merely illustrative, and are not intended to be limited to those described herein.

Embodiment 1

Figure 1:
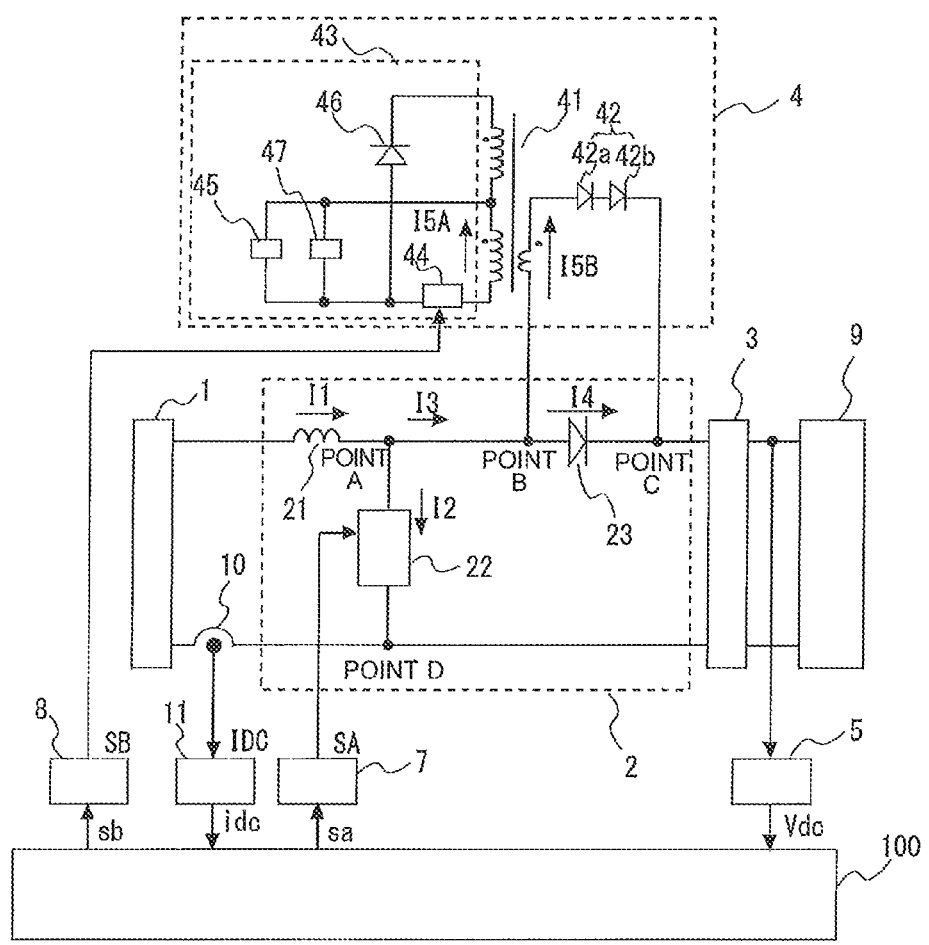
FIG. 1 is a diagram illustrating a system configuration mainly including a power converter according to Embodiment 1 of the present invention.
Figure 2:
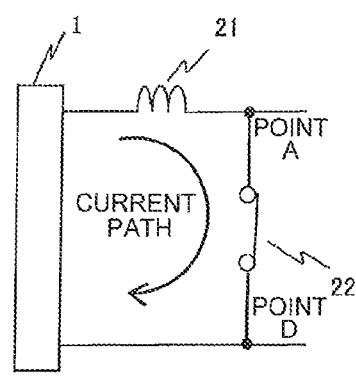
FIG. 2 is a diagram illustrating an example (first example) of an operation mode of the system according to Embodiment 1 of the present invention.
Figure 3:
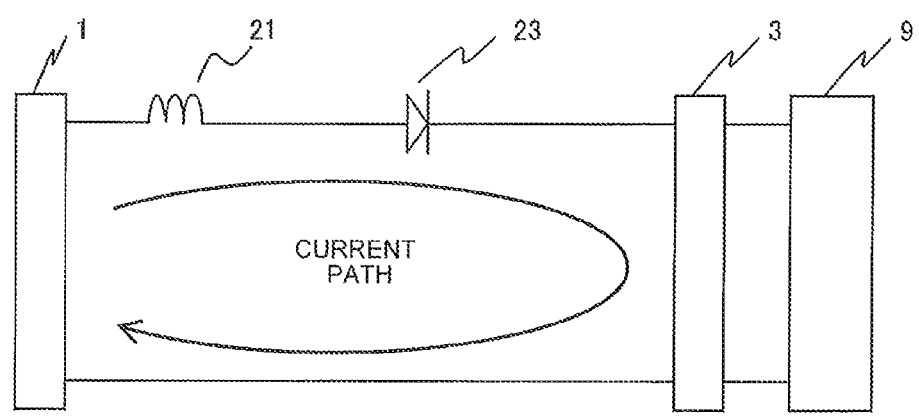
FIG. 3 is a diagram illustrating an example (second example) of the operation mode of the system according to Embodiment 1 of the present invention.
Figure 4:
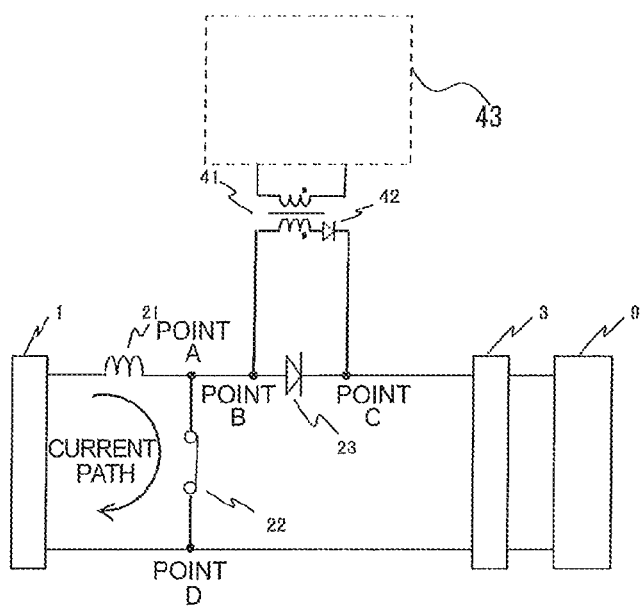
FIG. 4 is a diagram illustrating an example (third example) of the operation mode of the system according to Embodiment 1 of the present invention.

FIG. 1 is a diagram illustrating a system configuration mainly including a power converter according to Embodiment 1 of the present invention. First, a description is given of the system configuration illustrated in FIG. 1 including the power converter capable of performing highly efficient power conversion.

In the system illustrated in FIG. 1, the power converter is connected between a power source 1 and a load 9. As the power source 1, various kinds of power sources such as a DC power source, a single-phase power source, and a three-phase power source can be used. In the following description, the power source 1 is a DC power source. Further, the load 9 is, for example, a motor and an inverter device connected to the motor.

The power converter includes a boosting device (boosting circuit) 2 serving as a voltage changing device for boosting an applied voltage relating to power supply from the power source 1 to a predetermined voltage, a commutation device (commutation circuit) 4 for commutating a current flowing through the boosting device 2 to a different path (an other path) at a necessary timing, and a smoothing device (smoothing circuit) 3 for smoothing a voltage (output voltage) relating to operations of the boosting device 2 and the commutation device 4. The power converter further includes a voltage detection device 5 for detecting the voltage obtained by the smoothing device 3, and a controller 100 for controlling the boosting device 2 and the commutation device 4 based on the voltage relating to the detection by the voltage detection device 5. The power converter further includes a drive signal transmission device 7 for converting a drive signal sa supplied from the controller 100 into a drive signal SA suitable for the boosting device 2 and transmitting the drive signal SA to the boosting device 2, and a commutation signal transmission device 8 for converting a drive signal (commutation signal) sb supplied from the controller 100 into a drive signal SB suitable for the commutation device 4 and transmitting the drive signal SB to the commutation device 4.

The boosting device 2 in this embodiment includes, for example, a magnetic energy storage unit 21 constructed with a reactor connected to the positive side or the negative side of the power source 1, and a boost open/close switch unit 22 (power change open/close switch 22) and a boost rectifier 23 (power change rectifier 23) constructed with a rectifier, which are connected at a subsequent stage of the magnetic energy storage unit 21. In this case, as illustrated in FIG. 1, the rectifier of the boost rectifier 23 has an anode on the point B side and a cathode on the point C side. The boost open/close switch unit 22 including a switching element, for example, is opened and closed based on the drive signal SA transmitted from the drive signal transmission device 7, and controls electrical connection and electrical disconnection between the positive side and the negative side of the power source 1 via the boost open/close switch unit 22. The type of semiconductor element used as the switching element is not particularly limited, but a high withstand voltage element that can withstand electric power supplied from the power source 1 is used (for example, an insulated gate bipolar transistor (IGBT), a metal oxide semiconductor field effect transistor (MOSFET), etc.). In this case, although not illustrated in FIG. 1, the boost open/close switch unit 22 is supplied with electric power for performing the open/close operation from a switch operation power source. Further, the boost rectifier 23 constructed with a rectifier such as a pn junction diode, for example, is a backflow preventing element for rectifying a current (electric power) from the power source 1 side to the load 9 side and preventing the backflow from the load 9 side to the power source 1 side. In this embodiment, a rectifier having a large current capacity is used depending on the magnitude of electric power to be supplied from the power source 1 to the load 9. Further, in order to suppress electric power (energy) loss in the boost rectifier 23, an element having a low forward voltage (good Vf characteristics) is used for the rectification. The boost rectifier 23, which serves as a backflow preventing element, and the commutation device 4 form a backflow preventing device for preventing a backflow of a current from the load 9 side to the power source 1 side. The boost rectifier 23 of the boosting device 2 herein serves as the backflow preventing element, but another element can serve as the backflow preventing element to form the backflow preventing device.

Further, the commutation device 4 in this embodiment includes a transformer 41, a commutation rectifier 42, elements of a transformer drive circuit 43 for driving the transformer 41, and other components. In FIG. 1, primary-side and secondary-side windings of the transformer 41 have the same polarity. Then, the secondary-side winding of the transformer 41 is connected in series to the commutation rectifier 42. In addition, the commutation rectifier 42 is connected in parallel to the boost rectifier 23 of the boosting device 2.

The transformer 41 including a pulse transformer, for example, constructs a commutation operation device together with the transformer drive circuit 43. A voltage is applied to the primary-side winding to cause an excitation current to flow therethrough, to thereby induce a voltage in the secondary-side winding to cause a current to flow therethrough. In this manner, the current flowing through the boosting device 2 is commutated. In this case, the transformer 41 in this embodiment has the adjusted turns ratio between the primary-side winding and the secondary-side winding, and other such adjusted parameters. For example, the turns ratio between the primary-side winding and the secondary-side winding of the transformer 41 is adjusted to be A:B (A≥B, where B=1 or more). Further, the inductance ratio between the primary-side winding and the secondary-side winding is set to be substantially $A^2:B^2$ ($A^2 \geq B^2$, where B=1 or more). Through the adjustment of the turns ratio and other parameters, a surplus voltage can be suppressed while a voltage (approximately several V) equal to or higher than a voltage necessary for reverse recovery of the boost rectifier 23 (rectifier) is generated, and hence the reverse recovery can be performed without causing an excessive current to flow to the commutation device 4 side, and energy can be saved. Then, the above-mentioned effect can be obtained by a relatively easy method such as the adjustment of the turns ratio.

Further, the transformer 41 in this embodiment includes a reset winding connected to the primary-side winding. Through the connection of the reset winding, excitation energy can be regenerated on a transformer power source unit 45 side at the time of resetting so that electric power can be recovered, and hence the efficiency can be further increased. The transformer 41 is described in detail later.

The commutation rectifier 42 rectifies the current related to the commutation (the current flowing through the other path). In this case, the commutation rectifier 42 includes a plurality of rectifiers which are connected in series including, for example, a semiconductor element which has excellent electrical characteristics (in particular, recovery characteristics), has a small current capacity, and takes a short time to complete the reverse recovery. In this embodiment, two rectifiers 42a and 42b are connected in series. The rectifiers 42a and 42b are located on a path of the electric power supplied from the power source 1 to the load 9, and hence are required to be formed of high withstand voltage elements. Thus, in this case, a Schottky barrier diode made of silicon having good recovery characteristics in particular, or an element formed of, for example, a wide band-gap semiconductor containing silicon carbide (SiC), gallium nitride (GaN), or diamond as its material is used for the commutation rectifier 42.

Further, in this embodiment, the transformer drive circuit 43 is constructed with a commutation switch 44, the transformer power source unit 45, a transformer drive rectifier 46, and a transformer smoothing unit 47. The commutation switch 44 including a switching element such as a transistor, for example, is opened or closed based on the commutation signal SB transmitted from the commutation signal transmission device 8, to thereby supply electric power from the transformer power source unit 45 to the transformer 41 (primary winding side) or stop the supply of the electric power. In this case, the switching element may include an insulating unit for insulating the gate side and the drain (collector)-source (emitter) side from each other. In this case, it is preferred that the insulating unit be constructed with a photocoupler or a pulse transformer. Because the insulating unit is formed, the commutation device can be electrically disconnected from the control side such as the controller 100, to thereby prevent an excessive current from flowing to the control side. The transformer power source unit 45 serves as, for example, a power source for supplying electric power to the transformer 41 so as to cause the commutation device 4 to perform the commutation operation. Then, the voltage to be applied from the transformer power source unit 45 to the transformer 41 is set to be lower than the voltage (output voltage) to be applied from the boosting device 2 and the commutation device 4 to the smoothing device 3. In this case, although not particularly illustrated in FIG. 1, a limiting resistor, a high frequency capacitor, a snubber circuit, or a protective circuit may be inserted as necessary into a wiring path connecting the transformer power source unit 45, the commutation switch 44, and the primary-side winding of the transformer 41 in consideration of noise countermeasures, circuit protection in case of failure, and other circumstances. Further, the transformer power source unit 45 may be shared with the power source used for the boost open/close switch unit 22 to perform the opening and closing operation. The transformer drive rectifier 46 rectifies a current flowing through the transformer drive circuit 43 to supply electric power to the primary-side winding of the transformer 41. Further, the transformer smoothing unit 47 including a capacitor smoothes the electric power from the transformer power source unit 45 and supplies the smoothed electric power to the primary-side winding. Because the transformer smoothing unit 47 is provided to smooth the electric power, for example, an abrupt fluctuation of the transformer power source unit 45, an abrupt rise of the current, and other phenomena can be suppressed.

The smoothing device 3 is constructed with a smoothing capacitor, for example. The smoothing device 3 smoothes a voltage relating to the operation of the boosting device 2 and other devices, and applies the smoothed voltage to the load 9. Further, the voltage detection device 5 detects the voltage (output voltage Vdc) smoothed by the smoothing device 3. The voltage detection device 5 is constructed with a level shift circuit including voltage dividing resistors. In this case, when needed, the voltage detection device 5 may be added with an analog/digital converter in order to generate a signal (data) that can be used for the controller 100 to perform arithmetic processing and other processing.

The system in this embodiment further includes a current detection element 10 and a current detection device 11. The current detection element 10 detects a current at a node between the power source 1 and the negative side of the boost open/close switch unit 22. As the current detection element 10, for example, a current transformer or a shunt resistor is used. When transmitting a current related to the detection by the current detection element 10 as a signal, the current detection device 11 converts the current into a signal of a proper value (Idc) that can be processed by the controller 100, and inputs the converted signal to the controller 100. Thus, the current detection device 11 is constructed with an amplifier circuit, a level shift circuit, or a filter circuit. In this case, such circuit may be omitted as appropriate if the function of the current detection device 11 can be handled by the controller 100 instead.

The controller 100 performs the processing of generating and transmitting the drive signals based on the voltage relating to the detection by the voltage detection device 5 and/or the current related to the detection by the current detection element 10 and the detection by the current detection device 11. The power converter of FIG. 1 includes both of the voltage detection device 5 and the set of the current detection element 10 and the current detection device 11, but only one of the voltage detection device 5 and the set of the current detection element 10 and the current detection device 11 may be provided so that the controller 100 may perform the processing of generating the drive signals and other signals based only on the current or only on the voltage.

The controller 100 is constructed with an arithmetic unit such as a microcomputer and a digital signal processor, a device having an internal function similar to the arithmetic unit. In this embodiment, for example, based on the voltage and the current related to the detection by the voltage detection device 5 and the detection by the current detection element 10 and the current detection device 11, the controller 100 generates the signals for instructing the boost open/close switch unit 22 and the commutation switch 44 to operate, to thereby control the boosting device 2 and the commutation device 4. In this case, although not illustrated in FIG. 1, the controller 100 is supplied with electric power for performing the processing operations from a controller operation power source. This power source may be shared with the transformer power source unit 45. Further, in this embodiment, the controller 100 is described as being configured to control the operations of the boosting device 2 and the commutation device 4, but is not limited thereto. For example, two controllers may control the boosting device 2 and the commutation device 4, respectively.

The drive signal transmission device 7 is constructed with a buffer, a logic IC, or a level shift circuit, for example, and converts the drive signal sa into the drive signal SA to transmit the drive signal SA to the boosting device 2. Note that, for example, when this function is built into the controller 100, the drive signal transmission device 7 can be omitted as appropriate. In this case, the controller 100 only needs to transmit the drive signal sa as the drive signal SA to directly control the opening and closing operation of the boost open/close switch unit 22. Further, similarly to the drive signal transmission device 7, the commutation signal transmission device 8 is also generally constructed with a buffer, a logic IC, or a level shift circuit, and converts the commutation signal sb into the commutation signal SB to transmit the commutation signal SB to the commutation device 4. Note that, when this function is built into the controller 100, the commutation signal transmission device 8 can be omitted as appropriate. In this case, the controller 100 only needs to transmit the commutation signal sb as the commutation signal SB to directly control the opening and closing operation of the commutation switch 44. In the following description, the drive signal SA is regarded as the same as the drive signal sa transmitted from the controller 100, and the commutation signal SB is regarded as the same as the commutation signal sb (the drive signal SA and the commutation signal SB are thus referred to as "drive signal sa" and "commutation signal sb").

FIG. 2 to FIG. 5 are diagrams illustrating examples of operation modes of the system according to Embodiment 1 of the present invention. Next, the operation relating to the system of FIG. 1 and other drawings is described. The power conversion operation (boosting operation in this embodiment) of the power converter in this system is realized by adding the commutation operation of the commutation device 4 to a boost chopper. Thus, there are four operation modes in total based on a combination of the open/close states of the boost open/close switch unit 22 and the commutation switch 44.

First, the case of the state in which the boost open/close switch unit 22 is on (closed) and the commutation switch 44 is off (opened) is considered. In general, the boost rectifier 23 uses an element having a low forward voltage as compared to the commutation rectifier 42 having good recovery characteristics. Further, the winding of the transformer 41 is an inductance component, and hence no current flows when the excitation current is not caused to flow. Accordingly, in this case where the commutation switch 44 is off, no current flows through the path in which the commutation device 4 is provided (the other path). Then, because the boost open/close switch unit 22 is on, the positive side and the negative side of the power source 1 are electrically connected to each other and the current flows through the path of FIG. 2 (thus, no current flows through the path via the boost rectifier 23). In this manner, energy can be stored in the magnetic energy storage unit 21.

Next, the case where the boost open/close switch unit 22 is off and the commutation switch 44 is off is considered. Also in this case, because the commutation switch 44 is off, no current flows through the path in which the commutation device 4 is provided. Further, because the boost open/close switch unit 22 is off, the energy of the magnetic energy storage unit 21 can be supplied to the load 9 side via the smoothing device 3 through the path of FIG. 3 (the path via the boost rectifier 23).

In addition, the case where the boost open/close switch unit 22 is on and the commutation switch 44 is on is considered. In this case, the commutation switch 44 is on, but the boost open/close switch unit 22 is also in the on state, and the impedance on the power source 1 side is low. Accordingly, almost no current flows through the path in which the commutation device 4 is provided. Thus, the current flows through the path of FIG. 4, and the energy can be stored in the magnetic energy storage unit 21. This operation mode is an operation mode not used for control. The operation mode may be entered instantaneously due to a transmission delay of the commutation signal sb, but there is no particular problem for use.

Figure 5:
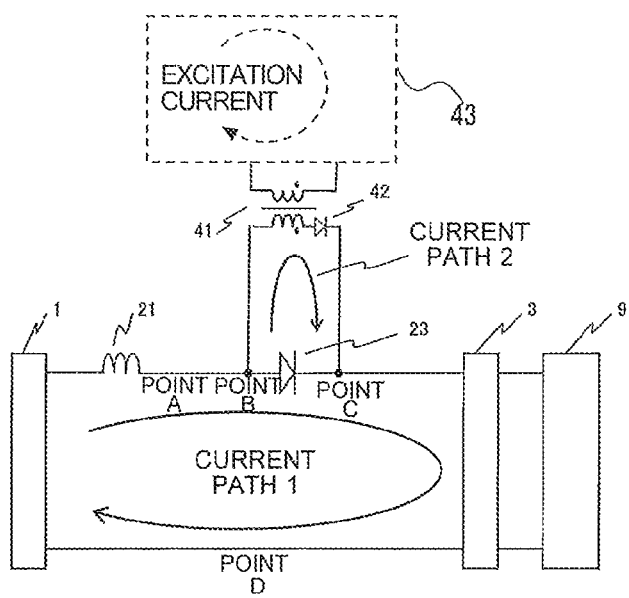
FIG. 5 is a diagram illustrating an example (fourth example) of the operation mode of the system according to Embodiment 1 of the present invention.

Then, the case where the boost open/close switch unit 22 is off and the commutation switch 44 is on is considered. In this case, because the boost open/close switch unit 22 is off, the current flows into the load 9 side via the boost rectifier 23 (Current Path 1). Further, because the commutation switch 44 is on, the transformer 41 is excited, and as illustrated in FIG. 5, the current flows also through the path in which the commutation device 4 is provided (Current Path 2). Then, when this state lasts for a predetermined period of time, the current is completely commutated so that the current flows only through the path in which the commutation device 4 is provided. Note that, when a current needs to be commutated only at a predetermined rate depending on system conditions, load conditions, and other conditions, the commutation operation may be finished before the commutation is fully completed. Even in this case, a great effect of reducing the recovery current can be obtained.

According to the respective operation modes described above, the commutation operation is performed when the boost open/close switch unit 22 is off and the commutation switch 44 is on, but the operation of storing the energy in the magnetic energy storage unit 21 in response to the opening and closing of the boost open/close switch unit 22 follows the operation of the boost chopper. Accordingly, when the boost open/close switch unit 22 is repeatedly switched (opened/closed) for an on time $T_{on}$ and an off time $T_{off}$, the point C is applied with an average voltage $E_C$, $E_C=(T_{on}+T_{off})\cdot E_1/T_{off}$, and the voltage is thus boosted. For simplification, the voltage of the power source 1 is represented by $E_1$.

Figure 6:
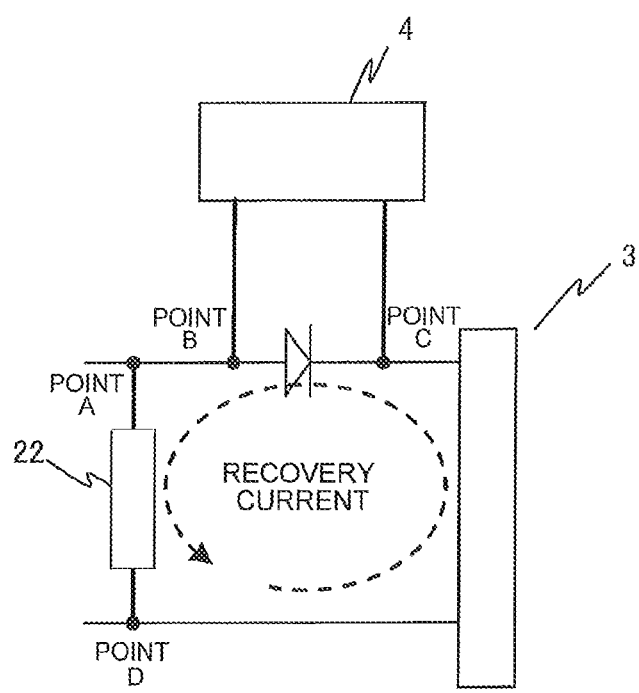
FIG. 6 is a diagram illustrating the flow of a recovery current.

FIG. 6 is a diagram illustrating the flow of a recovery current. When a pn junction diode, for example, is used for the boost rectifier 23, a short-circuit current flows through the path illustrated in FIG. 6 until the reverse recovery of the boost rectifier 23 is completed (until a reverse current is inhibited) (this short-circuit current is hereinafter referred to as "recovery current"). Then, the circuit loss is increased due to the recovery current flowing from the load 9 (smoothing device 3) side to the power source 1 side. Further, this current is responsible for displacement of a common-mode current, resulting in an increase in level of noise terminal voltage and radiation noise. Accordingly, cost is required for noise countermeasures. Further, a noise filter (not shown) is upsized, and the degree of freedom of installation space is limited.

Further, in general, a rectifier has a tendency that the amount of stored carriers increases as the current capacity increases. Accordingly, when the current capacity increases, the recovery current also increases due to a delay of reverse recovery. Further, the recovery current also increases as the applied reverse bias voltage becomes higher.

In view of the above, in this embodiment, the reverse recovery is not performed in a manner that a high reverse bias voltage is applied to the boost rectifier 23 having a large current capacity, but the reverse recovery is performed in a manner that the other path for commutation is provided and at the timing immediately before the boost open/close switch unit 22 is turned on (closed), a low reverse bias voltage is applied to the boost rectifier 23 via the transformer 41 and the commutation rectifier 42 of the commutation device 4, and thereafter the boost open/close switch unit 22 is controlled to be turned on (this control is hereinafter referred to as "commutation control").

Then, the controller 100 turns on the commutation signal sb for the commutation device 4 immediately before turning on the drive signal sa, to thereby generate the signal for commutating the current flowing through the boost rectifier 23 to the commutation rectifier 42 via the transformer 41.

Figure 7:
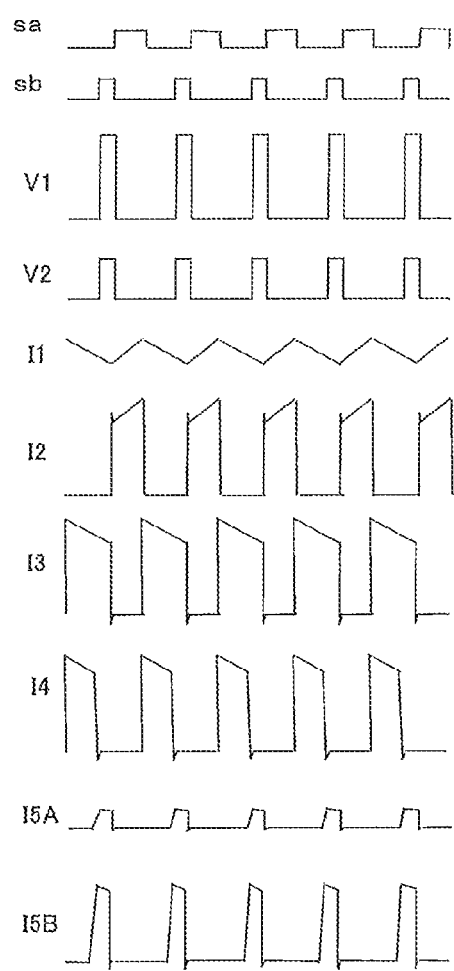
FIG. 7 is a diagram illustrating the waveforms of signals and the like at the time when commutation control is performed in the system according to Embodiment 1 of the present invention.

FIG. 7 is a diagram illustrating the waveforms of signals and the like at the time when the commutation control is performed in the system according to Embodiment 1 of the present invention. In FIG. 7, the waveforms of the drive signal sa, the commutation signal sb, a voltage V1 relating to the primary-side winding of the transformer 41, a voltage V2 relating to the secondary-side winding of the transformer 41, and currents I1 to I5 at the time when the commutation device 4 is operated (the commutation signal sb is transmitted) are illustrated.

As described above, the drive signal sa is a drive signal to be transmitted by the controller 100 in order to operate the boost open/close switch unit 22 of the boosting device 2. Further, the commutation signal sb is a drive signal to be transmitted by the controller 100 in order to operate the commutation switch 44 of the commutation device 4. In this case, the drive signal sa is a PWM signal in which the HI side is the active direction (on direction). When the drive signal sa is turned on, the boost open/close switch unit 22 is turned on (closed), and when the drive signal sa is turned off, the boost open/close switch unit 22 is turned off (opened). Further, the commutation signal sb is also a PWM signal in which the HI side is the active direction (on direction). Further, the respective current waveforms represent an example in which the on time and the off time of the drive signal sa are controlled so that the output voltage Vdc, that is, the output to the load 9, may become constant after the power source 1 is powered on, and a sufficient period of time has elapsed thereafter. Then, the duty ratio (the ratio between the on time and the off time) of the drive signal sa shows a substantially constant value.

The voltage V1 represents a schematic waveform of the voltage across the primary-side winding of the transformer 41. Further, the voltage V2 represents a schematic waveform of the voltage across the secondary-side winding of the transformer 41.

The current I1 represents the waveform of the current flowing between the power source 1 and the boosting device 2 (magnetic energy storage unit 21). The current I2 represents the waveform of the current flowing through the boost open/close switch unit 22 of the boosting device 2. The current I3 represents the waveform of the current flowing between the point A and the point B of FIG. 1. In this case, the current I1 branches into the current I2 and the current I3 (I1=I2+I3).

Further, the current I4 represents the waveform of the current flowing through the boost rectifier 23. The current I5A represents the waveform of the current flowing through the primary winding of the transformer 41. The current I5B represents the waveform of the current flowing through the secondary winding of the transformer 41. In this case, the current I3 branches into the current I4 and the current I5B (I3=I4+I5B).

In the power converter in this embodiment, the turns ratio between the primary-side winding and the secondary-side winding of the transformer 41 is adjusted, and hence, as illustrated in FIG. 7, the magnitudes of the voltage V1 and the voltage V2 can be arbitrarily set to be different from each other. Further, the magnitudes of the current I5A and the current I5B are also different from each other. Through the adjustment of the voltage V2, the electric power relating to the commutation can be suppressed to save the energy.

Next, the relationship between the drive signal sa and the commutation signal sb and the currents flowing is described with reference to FIG. 1 and FIG. 7. When the commutation signal sb is turned on immediately before the drive signal sa is turned on (the boost open/close switch unit 22 is turned on), the current starts to flow through the secondary-side winding of the transformer 41 due to the excitation current. Accordingly, the current starts to flow while branching into the boost rectifier 23 side and the commutation rectifier 42 side (the other path). After that, when the on state of the commutation signal sb is maintained, the current no longer flows to the boost rectifier 23 side, and all the currents flow to the commutation rectifier 42 side (the commutation is completed).

At this time, the applied voltage relating to the transformer power source unit 45 is set to be sufficiently lower than the output voltage of the boosting device 2 (such as the potential between the point C and the point D). In this manner, the boost rectifier 23 can be turned off (reverse recovery) even with a low reverse bias voltage.

Then, in this state, the drive signal sa is turned on. At this time, the reverse recovery operation is performed in the commutation rectifier 42. Also in this case, the recovery current is generated. However, the current supply period in the reverse recovery of the commutation rectifier 42 is significantly shorter than that for the boost rectifier 23, and hence the value of the effective current required for the commutation rectifier 42 can be set to be small. Consequently, an element which stores a small amount of carriers and has a small current capacity can be used, and hence the recovery current can be reduced as compared to the boost rectifier 23 (note that, an element is selected in consideration of the peak current).

Figure 8:
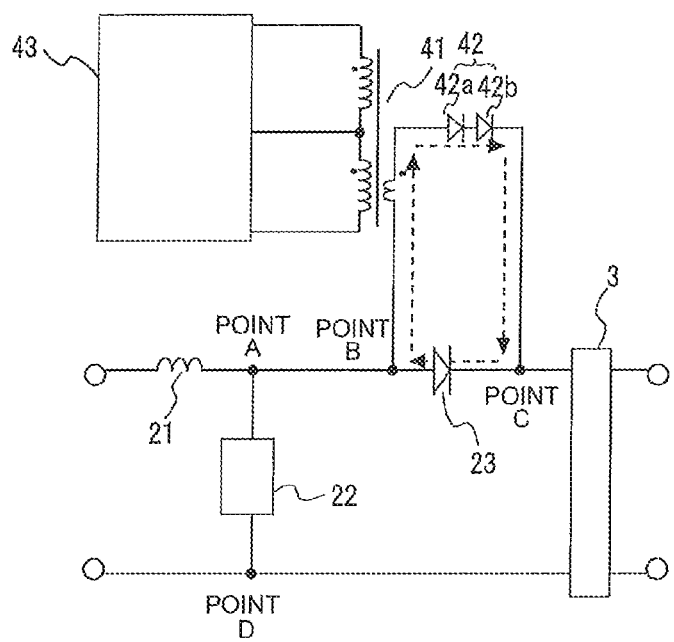
FIG. 8 is a diagram illustrating a path of a recovery current at the time of reverse recovery of a boost rectifier 23 according to Embodiment 1 of the present invention.

FIG. 8 is a diagram illustrating a path of the recovery current during the reverse recovery of the boost rectifier 23 according to Embodiment 1 of the present invention. When the commutation signal sb changes from off to on, the recovery current during the reverse recovery of the boost rectifier 23 flows through the path from the secondary-side winding of the transformer 41 (the side connected to the commutation rectifier 42) to the secondary-side winding of the transformer 41 (the point B side of FIG. 3) via the commutation rectifier 42 and the boost rectifier 23 in the stated order.

In this case, the voltage necessary for causing the current related to the reverse recovery of the boost rectifier 23 to flow through the commutation device 4 depends on the voltage level of the transformer power source unit 45 of the commutation device 4. For example, in the case where the transformer power source unit 45 can supply electric power independently of the system, as exemplified by an external power source, the voltage level of the transformer power source unit 45 may be adjusted. Meanwhile, there may be a case where it is desired to use a power source for generating necessary electric power in the system due to system constraints. In such a case, for example, arbitrary one output, such as a switching power source installed in the system in order to acquire a controller power source, is used.

The commutation device 4 performs the commutation operation in order to suppress the generation of the recovery current in the boost rectifier 23. Thus, if the voltage causing the reverse recovery of the boost rectifier 23 can be obtained to cause a corresponding current to flow, as the electric power relating to the commutation operation not directly contributing to power conversion becomes lower, the efficiency is increased and the energy is saved more. However, this power source cannot necessarily apply an appropriate voltage in the operation of the commutation device 4. If an excessive voltage higher than the voltage causing the reverse recovery of the boost rectifier 23 is applied so that the current corresponding to the applied voltage flows, the recovery loss is increased by the amount of electric power expressed by the product of the applied voltage and the recovery current. Further, if the application of the appropriate voltage is attempted to be achieved by multi-output of the switching power source, such as providing an additional output, the cost of the system is increased.

In view of the above, when the winding ratio and other parameters of the transformer 41 are appropriately set depending on the voltage level of the transformer power source unit 45, in the reverse recovery of the boost rectifier 23, an appropriate voltage can be applied to the commutation device 4 side and an appropriate current can be caused to flow therethrough without being wasted.

When the winding ratio between the primary-side winding and the secondary-side winding of the transformer 41 is A:B, and when the commutation switch 44 is turned on so that the voltage V1 is induced in the primary-side winding, the voltage V2 of the secondary-side winding is V2=(B/A)·V1. When the inductance ratio is $A^2:B^2$, the voltage V2 of the secondary-side winding is V2=($B^2/A^2$)·V1. Because A≥B is established, the voltage V2 can be set to be equal to or lower than the voltage V1 through the adjustment of the windings of the transformer 41. In this manner, the voltage relating to the secondary-side winding and the voltage relating to the primary-side winding are uniquely determined based on the winding ratio and the inductance ratio.

In consideration of the impedance of the circuit pattern, the on voltage of the switch, and other characteristics, the windings of the transformer 41 of the commutation device 4 are set so that an appropriate voltage causing the reverse recovery of the boost rectifier 23 of the boosting device 2 can be applied across the boost rectifier 23. Because the appropriate voltage can be applied to the commutation device 4 side, the reverse recovery of the boost rectifier 23 can be performed with a voltage not higher than necessary, and hence the loss can be reduced.

Further, as illustrated in FIG. 7, when the current I5A flows through the primary winding and the current I5B flows through the secondary-side winding at the time of completion of the commutation, A·I5A=B·I5B is established in accordance with the law of equal ampere-turns. Thus, the current I5A flowing through the primary-side winding of the transformer 41 is B/A times as large as the current I5B flowing through the secondary-side winding, and hence the return current on the primary winding side can be suppressed to be smaller than the current flowing on the secondary winding side. Thus, a necessary voltage can be applied without the need of overspecification of the current capacity of each element connected to the primary winding. Consequently, through the setting of the turns of the windings of the transformer 41, the recovery loss can be reduced without significantly increasing the cost. In the system in this embodiment, the values of the winding ratio and the inductance ratio between the primary winding and the secondary-side winding are each adjusted to be different from each other as a basic configuration, but this is not intended to prevent the adjustment of the winding ratio and the inductance ratio to be 1:1.

Figure 9:
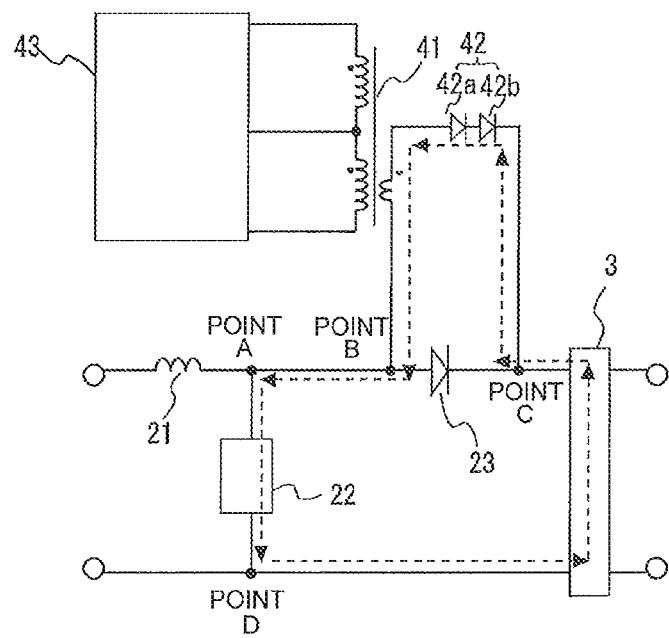
FIG. 9 is a diagram illustrating a path of a recovery current at the time of reverse recovery of a commutation rectifier 42 according to Embodiment 1 of the present invention.

FIG. 9 is a diagram illustrating a path of the recovery current during the reverse recovery of the commutation rectifier 42 according to Embodiment 1 of the present invention. When the commutation signal sb changes from on to off, the recovery current flows through the path from the smoothing device 3 (positive side) to the smoothing device 3 (negative side) via the commutation rectifier 42 and the boost open/close switch unit 22 in the stated order.

It is desired that, as described above, the element having the excellent characteristics such as the wide band-gap semiconductor be used in the commutation rectifier 42. However, there may be some circumstances depending on a system to be used, that is, it is desired to keep the cost as low as possible, for example.

Now, attention is paid to the rectifiers. The rectifiers 42a and 42b on the path of the commutation rectifier 42 during the reverse recovery can mainly be regarded as capacitance components. The capacitance component of the rectifier 42a during the reverse recovery is represented by $C_{42a}(t)$. Moreover, the capacity of the rectifier 42b during the reverse recovery is represented by $C_{42b}(t)$. In this case, a combined capacitance component C(t) in the commutation rectifier 42 can be substantially expressed by Expression (1).

[Math. 1]

$$C(t)=C_{42a}(t) \cdot C_{42b}(t)/\{C_{42a}(t)+C_{42b}(t)\} \quad (1)$$

From Expression (1), a value of the combined capacitance component C(t) is smaller than a value of $C_{42a}(t)$ or $C_{42b}(t)$ in general. Therefore, with such a configuration that the plurality of rectifiers 42a and 42b are connected in series in the commutation rectifier 42, the capacitance components of the rectifiers that affect the reverse recovery time can be equivalently reduced, with the result that the recovery current can be suppressed.

As described above, as compared to the commutation rectifier 42 formed by using one expensive rectifier having the excellent reverse recovery characteristics, the commutation rectifier 42 formed by connecting a plurality of inexpensive rectifiers in series can maintain the similar characteristics at a lower cost, even though the inexpensive rectifiers may have reverse recovery characteristics poorer than those of the expensive rectifier.

Moreover, when a plurality of rectifiers are connected in series, even if one of the rectifiers causes a short-circuit failure, the rectification can be performed by the other rectifiers. Thus, the system can be protected with high reliability. Further, when a current flows through the path of the commutation rectifier 42 during the reverse recovery, the commutation rectifier 42 is required to have breakdown characteristics equal to or more than voltages at both ends of the smoothing device 3. With such a configuration that the commutation rectifier 42 is formed by using the plurality of rectifiers 42a and 42b, for example, the system having higher reliability also in breakdown characteristics can be constructed. In this embodiment, the two rectifiers 42a and 42b are herein connected in series, but the number of rectifiers to be connected is not limited thereto.

As a result, according to the system in Embodiment 1, the commutation device 4 is provided in the power converter, and the current flowing through the boosting device 2 is commutated to the smoothing device 3 side through the other path, and hence the reverse recovery of the boost rectifier 23 is performed before the boost open/close switch unit 22 is turned on so that the recovery current, which flows in response to the turn-on of the boost open/close switch unit 22, may flow not via the boost rectifier 23 which has a low forward voltage but through which a large amount of recovery current flows but via the commutation rectifier 42 which is short in time relating to the reverse recovery and has good recovery characteristics. Consequently, the recovery current in the power converter can be reduced. Further, the current flows through the boost rectifier 23 having a low forward voltage when the commutation operation is not performed (normal state), and hence the loss during the operation of the power conversion of the boosting device 2 can also be suppressed. Consequently, for example, even when an element having a large current capacity is used for the boost rectifier 23, the recovery loss and the conduction loss can be reduced irrespective of the current capacity of the element, the recovery characteristics of the element, and other characteristics in the boosting device 2. Thus, although the commutation operation of the commutation device 4 and other operations are performed, the loss and the noise amount (level of noise terminal voltage, radiation noise, etc.) caused by the recovery current can be reduced in the system as a whole.

Moreover, the plurality of rectifiers 42a and 42b are connected in series to form the commutation rectifier 42, and hence the capacitance component in the commutation rectifier 42 can be reduced, thereby being capable of reducing the reverse recovery time and suppressing the recovery current. Moreover, the characteristics are not lost even when inexpensive rectifiers are used in the configuration, and hence the commutation rectifier 42 can be formed at a low cost.

Then, in this embodiment, the turns ratio and other parameters between the primary-side winding and the secondary-side winding of the transformer 41 are adjusted so that the voltage of the secondary-side winding in the commutation operation can be prevented from being surplus while securing a voltage equal to or higher than the voltage causing the reverse recovery of the boost rectifier 23, and hence the reverse recovery can be performed without an excessive current flowing to the commutation device 4 side.

Consequently, the electric power relating to the commutation operation not directly contributing to the power conversion can be reduced, and hence the loss can be reduced in the power converter as a whole to save the energy. Then, this effect can be easily realized through the adjustment of the turns ratio and other parameters of the transformer 41. Further, an abrupt rise of the current can be suppressed due to the inductance component of the transformer 41, and hence the generation of noise can be suppressed. Consequently, the present invention is applicable also to an apparatus for handling a large capacity in which noise is liable to be generated, irrespective of the capacity and other characteristics.

Further, the reset winding is provided to the primary-side winding of the transformer 41 of the commutation device 4, and hence the electric power can be recovered at the time of resetting, and the transformer 41 can be operated with high efficiency. In addition, in the commutation device 4, the transformer smoothing unit 47 is provided between the transformer power source unit 45 for the transformer and the primary-side winding of the transformer 41, and hence the supply of electric power in which the abrupt fluctuation of the transformer power source unit 45 and the abrupt rise of the current are suppressed can be performed.

Further, the wide gap-band semiconductor is used for the commutation rectifier 42, and hence the power converter with low loss can be obtained. Further, because the electric power loss is small, the efficiency of the element can be increased. A wide gap-band semiconductor is high in permissible current density, and hence the use of a wide gap-band semiconductor can downsize the element and also downsize the apparatus in which the element is incorporated. A wide gap-band semiconductor can also be used for another element than the commutation rectifier 42, for example, the commutation switch 44, which does not affect the loss in the system as a whole.

In this case, instead of the wide gap-band semiconductor, for example, a Schottky barrier diode having a low forward voltage and a high breakdown voltage with a small loss may be used for the commutation rectifier 42. When such element has a larger permissible current effective value according to its specifications, crystal defects are increased and the cost is increased. According to the power converter (system) in this embodiment, the period during which the current flows through the other path is short, and hence an element having a small permissible current effective value (having a small current capacity) can be used for the rectifier in the commutation device. Consequently, the power converter with high cost performance and high efficiency can be realized.

Further, the boosting device 2, the secondary-side winding of the transformer 41, and the commutation rectifier 42 can be insulated from the transformer drive circuit 43, the controller 100, and the commutation signal sb via the transformer 41, and hence the commutation signal sb (commutation signal SB) can be transmitted relatively easily. Then, the device applied with high voltage and the device operating with low voltage can be electrically separated from each other. Further, the system with high safety and high reliability can be constructed. In this embodiment, the commutation operation device is constructed with the transformer 41 and the transformer drive circuit 43, but the device configuration can be modified as long as the commutation operation of commutating the current to the other path can be performed, although the above-mentioned effects may not be exerted.

Embodiment 2

FIG. 10 is a diagram illustrating a system configuration mainly including a power converter according to Embodiment 2 of the present invention. In FIG. 10, the devices and the like denoted by the same reference symbols as those in FIG. 1 perform the same operations and the like as those described in Embodiment 1.

In FIG. 10, similarly to the commutation switch 44 described in Embodiment 1, commutation switches 44a and 44b control the supply of electric power from the transformer power source unit 45 to the primary winding of the transformer 41 and the stop of the supply based on the commutation signal sb. According to the system in this embodiment, both of the commutation switches 44a and 44b are controlled to be opened or closed based on the commutation signal sb, and hence even when one of the commutation switches 44a and 44b undergoes a short-circuit failure, for example, the commutation operation can be continued. Consequently, the reliability of the system (apparatus) can be enhanced to protect the system.

Embodiment 3

Figure 11:
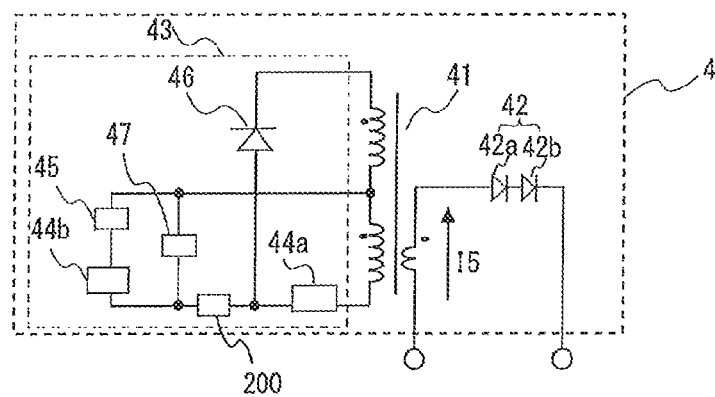
FIG. 11 is a diagram illustrating a configuration of a commutation device in a power converter according to Embodiment 3 of the present invention.

FIG. 11 is a diagram illustrating a configuration of a commutation device in a power converter according to Embodiment 3 of the present invention. In FIG. 11, the devices and the like denoted by the same reference symbols as those in FIG. 1 perform the same operations and the like as those described in Embodiment 1.

In FIG. 11, a current detection unit 200 includes a current detection element, and transmits a signal relating to the current flowing through the primary-side winding of the transformer 41 (transformer drive circuit 43) to the controller 100. The current detection unit 200 includes a current transformer or a resistor. When the controller 100 determines, based on the signal transmitted from the current detection unit 200, that a current higher than a preset possible current value flows, the controller 100 stops the transmission of the commutation signal sb to turn off the commutation switch 44. The operation of the commutation switch 44 is stopped so that no current flows through the transformer drive circuit 43, to thereby stop the commutation operation of the commutation device 4. In this manner, the reliability of the system (apparatus) can be enhanced to protect the system. Further, whether or not to shorten the period of the commutation operation or to stop the commutation device 4 is determined based on the detected current. In this manner, magnetic flux saturation of the transformer 41 and other phenomena can be prevented to enhance the reliability.

Embodiment 4

Figure 12:
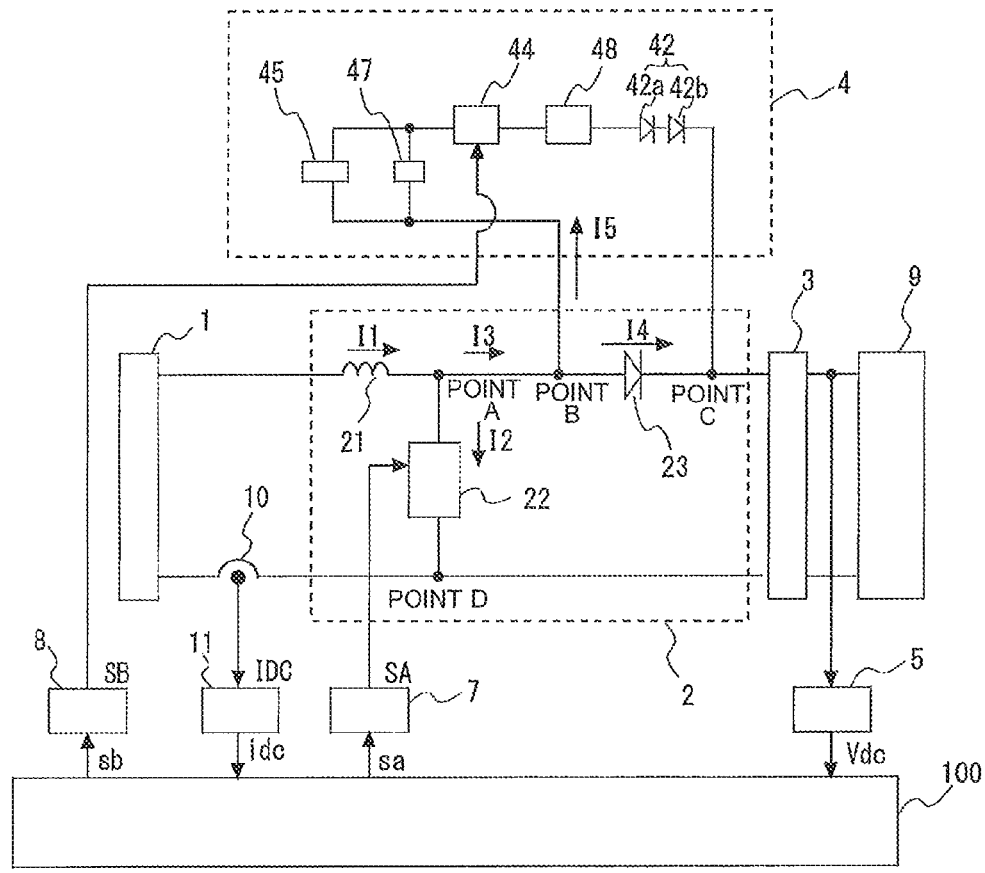
FIG. 12 is a diagram illustrating a system configuration mainly including a power converter according to Embodiment 4 of the present invention.

FIG. 12 is a diagram illustrating a system configuration mainly including a power converter according to Embodiment 4 of the present invention. In FIG. 12, the devices and the like denoted by the same reference symbols as those in FIG. 1 perform the same operations and the like as those described in Embodiment 1. A current limiting unit 48 in this embodiment includes a resistor, for example, and limits the current flowing through the commutation device 4 in the commutation operation.

In Embodiment 1 and other embodiments described above, the transformer 41 is provided, and the winding ratio and other parameters of the transformer 41 are adjusted. Then, a voltage which is equal to or higher than the voltage causing the reverse recovery of the boost rectifier 23 and which is not excessive is applied to the secondary-side winding, to thereby prevent an excessive current from flowing to the commutation device 4 side. In this embodiment, the current limiting unit 48 is used to adjust so that the current flowing through the commutation device 4 in the commutation operation is prevented from being excessive.

The use of the current limiting unit 48 as in this embodiment can simplify the circuit configuration of the commutation device 4. In this case, the current rises abruptly as compared to the case where the transformer 41 is used as in Embodiment 1 and other embodiments. Noise may be generated, but it is effective to apply this configuration to an apparatus for converting electric power having a relatively small capacity.

Embodiment 5

FIG. 13 is a diagram illustrating a system configuration mainly including a power converter according to Embodiment 5 of the present invention. In FIG. 13, the devices and the like denoted by the same reference symbols as those in FIG. 12 perform the same operations and the like as those described in Embodiment 4.

The power converter in this embodiment includes, as illustrated in FIG. 13, instead of the transformer power source unit 45 in Embodiment 4, a power source generation device 6 for generating the power source for the commutation device 4 based on the electric power supplied from the power source 1. In this case, in FIG. 13, the power source generation device 6 is illustrated as being independent of the commutation device 4, but may not particularly be independent instead.

The power source generation device (power source generation circuit) 6 in this embodiment includes a power source generation smoothing unit 62 and a switching power source unit 63. The switching power source unit 63 converts the supplied electric power into electric power for driving the commutation device 4. In this embodiment, the switching power source unit 63 is constructed with a DC/DC converter for performing the conversion based on electric power supplied from the power source 1 being a DC power source to the power converter. Further, the power source generation smoothing unit 62 smoothes the electric power from the switching power source unit 63.

As described above, according to the power converter in this embodiment, the electric power to be supplied to the commutation device 4 can be acquired in the system.

Embodiment 6

FIG. 14 is a diagram illustrating a system configuration mainly including a power converter according to Embodiment 6 of the present invention. In FIG. 14, the devices and the like denoted by the same reference symbols as those in FIG. 1, FIG. 13, and other drawings perform the same operations and the like as those described in Embodiment 1, Embodiment 5, and other embodiments.

The power converter in this embodiment includes, as illustrated in FIG. 14, instead of the transformer power source unit 45 which constructs a part of the transformer drive circuit 43 in Embodiment 1 and other embodiments, the power source generation device 6 for generating the power source for the transformer drive circuit 43 based on the electric power supplied from the power source 1. In this case, in FIG. 14, the power source generation device 6 is illustrated as being independent of the transformer drive circuit 43, but may not particularly be independent instead.

The power source generation device (power source generation circuit) 6 in this embodiment includes a power source generation smoothing unit 62 and a switching power source unit 63. The switching power source unit 63 converts the supplied electric power into electric power for driving the transformer drive circuit 43 (transformer 41). In this embodiment, the switching power source unit 63 is constructed with a DC/DC converter for performing the conversion based on electric power supplied from the power source 1 being a DC power source to the power converter. Further, the power source generation smoothing unit 62 smoothes the electric power from the switching power source unit 63 and supplies the smoothed electric power to the transformer drive circuit 43 (primary-side winding of the transformer 41).

As described above, according to the power converter in this embodiment, the electric power to be supplied to the commutation device 4 (transformer drive circuit 43) can be acquired in the system.

Embodiment 7

Figure 15:
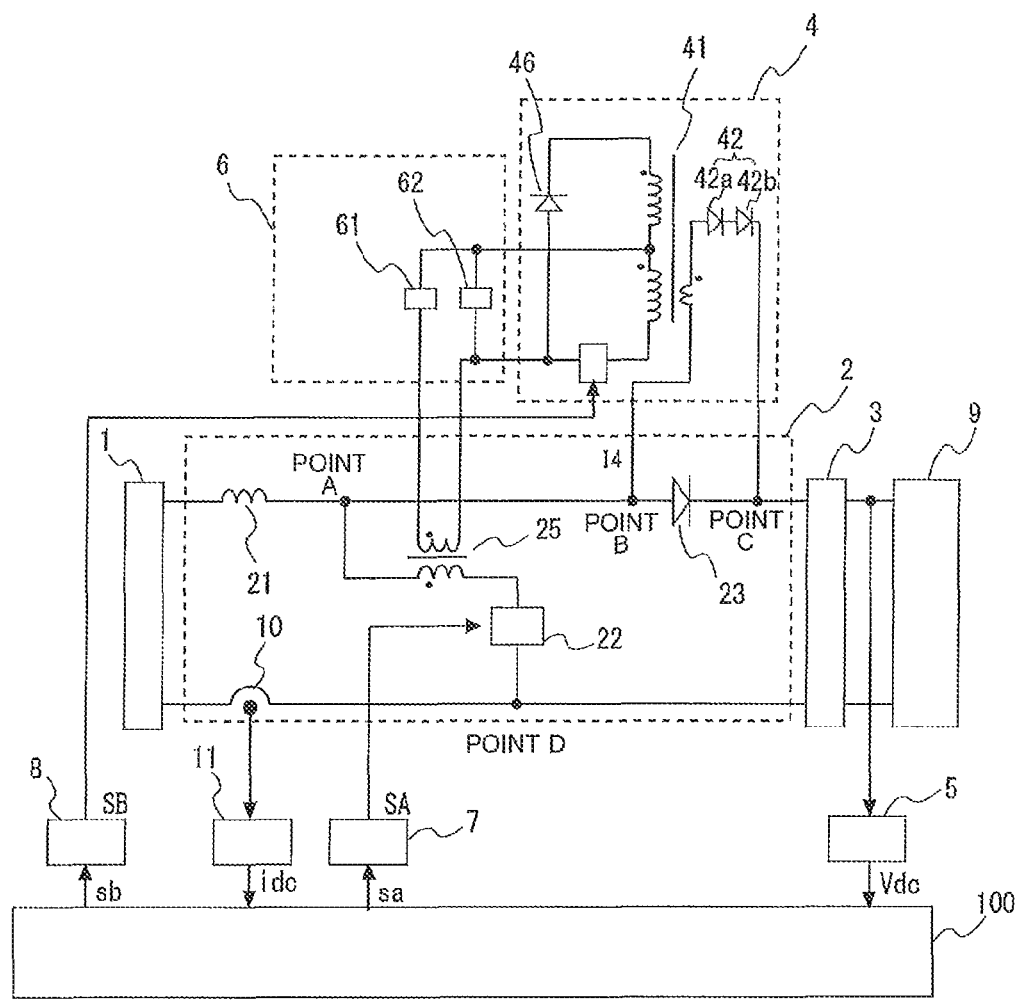
FIG. 15 is a diagram illustrating a system configuration mainly including a power converter according to Embodiment 7 of the present invention.

FIG. 15 is a diagram illustrating a system configuration mainly including a power converter according to Embodiment 7 of the present invention. In FIG. 15, the devices and the like denoted by the same reference symbols as those in FIG. 14 and other drawings perform the same operations and the like as those described in Embodiment 6 and other embodiments.

In the power converter in this embodiment, the boosting device 2 includes a transformer unit 25. The transformer unit 25 is constructed with a transformer. In the transformer unit 25, a voltage is induced in a secondary-side winding based on a current flowing through a primary-side winding in response to the opening and closing of the boost open/close switch unit 22, and the induced voltage is applied to the power source generation device 6. Further, the power source generation device 6 includes a power source generation rectifier 61. The power source generation rectifier 61 is constructed with a rectifier such as a diode, and rectifies the current flowing based on the voltage applied by the transformer unit 25. Then, the power source generation smoothing unit 62 smoothes the rectified current to supply electric power to the transformer drive circuit 43 (the primary-side winding of the transformer 41) to the primary-side winding of the transformer 41. Alternatively, the transformer unit 25 may be included in the magnetic energy storage unit 21. In other words, at least a part of the magnetic energy storage unit 21 may be used like a transformer, and an auxiliary (secondary) winding may be provided to the reactor to extract a part of energy, to thereby supply electric power required for the power source generation device 6. In this manner, the number of components may be reduced to downsize the apparatus depending on various conditions such as the system configuration and the load.

As described above, according to the power converter in this embodiment, the electric power to be supplied to the commutation device 4 (transformer drive circuit 43) can be acquired from the power converter (boosting device 2). The boost open/close switch unit 22 of the boosting device 2 can be used, and hence the number of elements (components) for generating the power source for the commutation device 4 can be suppressed to reduce the cost. Further, the operation of the boosting device 2 and the operation of the commutation device 4 can be synchronized with each other. For example, when the boosting device 2 is not operating, no recovery current is generated and the commutation device 4 is not required to be operated, and hence standby power can be reduced. In addition, the base circuit can be easily shared among circuit boards forming the devices except for the commutation device 4.

Embodiment 8

Figure 16:
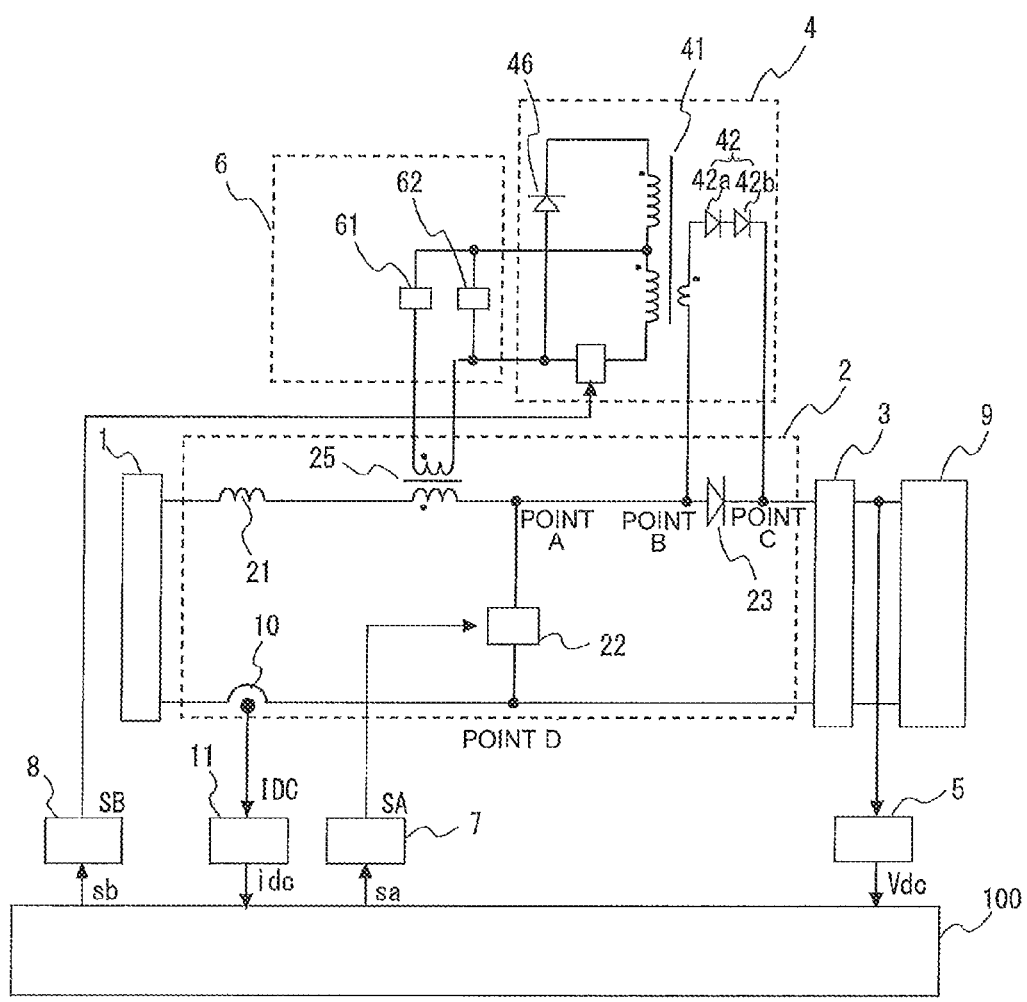
FIG. 16 is a diagram illustrating a system configuration mainly including a power converter according to Embodiment 8 of the present invention.

FIG. 16 is a diagram illustrating a system configuration mainly including a power converter according to Embodiment 8 of the present invention. In FIG. 16, the devices and the like denoted by the same reference symbols as those in FIG. 15 and other drawings perform the same operations and the like as those described in Embodiment 7 and other embodiments.

In this embodiment, the configuration devices and others are the same as those in Embodiment 7. In Embodiment 7, the transformer unit 25 is connected in parallel to the boost rectifier 23 (the transformer unit 25 is connected between the point A and the boost open/close switch unit 22). In this embodiment, the transformer unit 25 is connected in series to the boost rectifier 23 (the transformer unit 25 is connected between the magnetic energy storage unit 21 and the point A). Even when the power converter is configured as described above, the electric power to be supplied to the commutation device 4 (transformer drive circuit 43) can be acquired from the power converter (boosting device 2), and the same effects as those of the power converter in Embodiment 5 and other embodiments are exerted.

Embodiment 9

Figure 17:
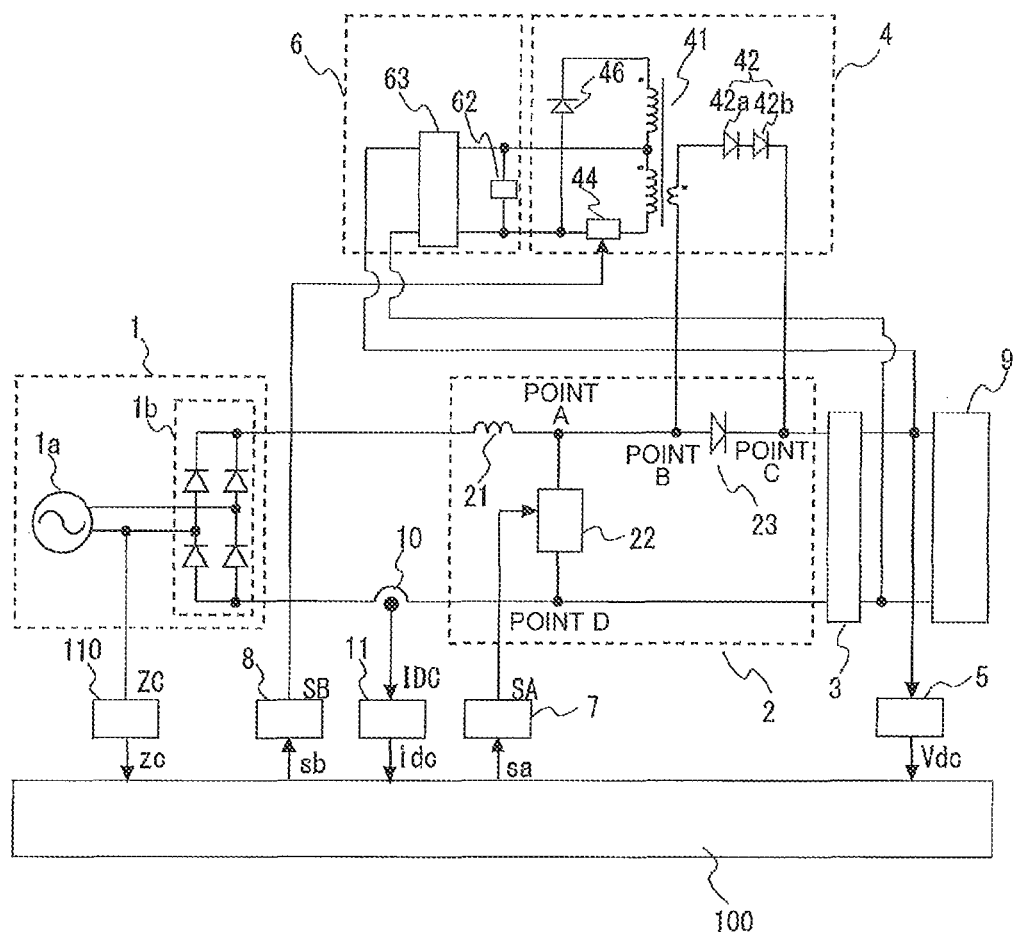
FIG. 17 is a diagram illustrating a system configuration mainly including a power converter according to Embodiment 9 of the present invention.

FIG. 17 is a diagram illustrating a system configuration mainly including a power converter according to Embodiment 9 of the present invention. In FIG. 17, the devices and the like denoted by the same reference symbols as those in FIG. 14 and other drawings perform the same operations and the like as those described in Embodiment 6 and other embodiments.

In the power converter in this embodiment, the power source 1 is constructed with a single-phase AC power source 1a and a rectifying device 1b such as a diode bridge. Then, electric power supplied to the load 9 being the output of the power converter is also supplied to the power source generation device 6. Even when the power source in the system is applied to the single-phase AC power source in this manner, the same effects as those described above in each of the embodiments can be exerted. An impedance detection unit 110 detects an impedance ZC between the single-phase AC power source 1a and the rectifying device 1b, and transmits a detection signal zc to the controller 100.

Embodiment 10

Figure 18:
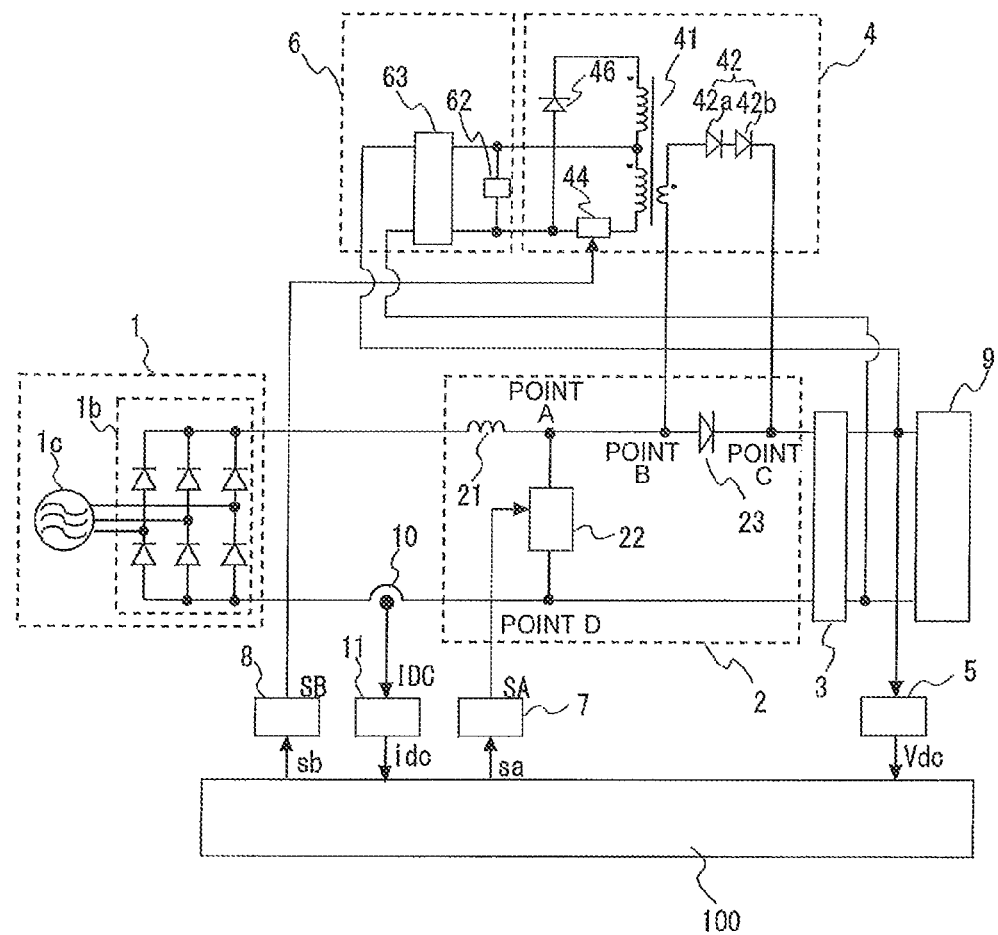
FIG. 18 is a diagram illustrating a system configuration mainly including a power converter according to Embodiment 10 of the present invention.

FIG. 18 is a diagram illustrating a system configuration mainly including a power converter according to Embodiment 10 of the present invention. In FIG. 18, the devices and the like denoted by the same reference symbols as those in FIG. 14 and other drawings perform the same operations and the like as those described in Embodiment 6 and other embodiments.

In the power converter in this embodiment, the power source 1 is constructed with a three-phase AC power source 1c and the rectifying device 1b such as the diode bridge. Further, electric power supplied to the load 9 being the output of the power converter is also supplied to the power source generation device 6. Even when the power source in the system is applied to the three-phase AC power source in this manner, the same effects as those described above in each of the embodiments can be exerted.

Embodiment 11

Figure 19:
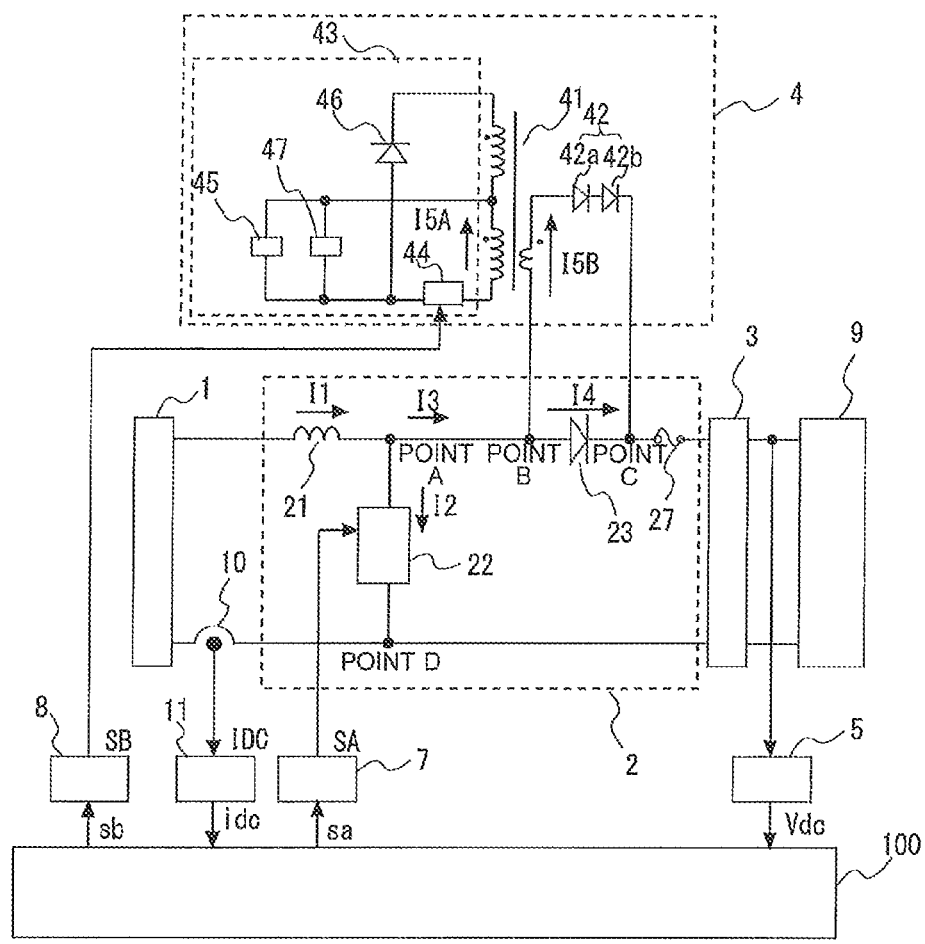
FIG. 19 is a diagram illustrating a system configuration mainly including a power converter according to Embodiment 11 of the present invention.

FIG. 19 is a diagram illustrating a system configuration mainly including a power converter according to Embodiment 11 of the present invention. In FIG. 19, the devices and the like denoted by the same reference symbols as those in FIG. 1 and other drawings perform the same operations and the like as those described in Embodiment 1 and other embodiments.

In the power converter in this embodiment, in the boosting device 2, a current interruption unit (interruption device) 27, such as a fuse or a protective switch, for interrupting a circuit when an excessive current flows therethrough is connected on a path of a current flowing from the power source 1 side to the load 1 side.

Consequently, the power converter (system) can be protected.

Embodiment 12

In the above-mentioned embodiments, a description has been given of the power converter in which the boosting device 2 is subjected to the commutation by the commutation device 4 and which performs power conversion by boosting the voltage of the power source 1, but the present invention is not limited thereto. The same effects as those described above in each of the embodiments can be exerted even in a power converter in which the boosting device 2 is replaced with a voltage changing device as exemplified by a buck device and a boost/buck device, which is capable of converting electric power to be supplied to the load 9 through the change in voltage.

Embodiment 13

Figure 20:
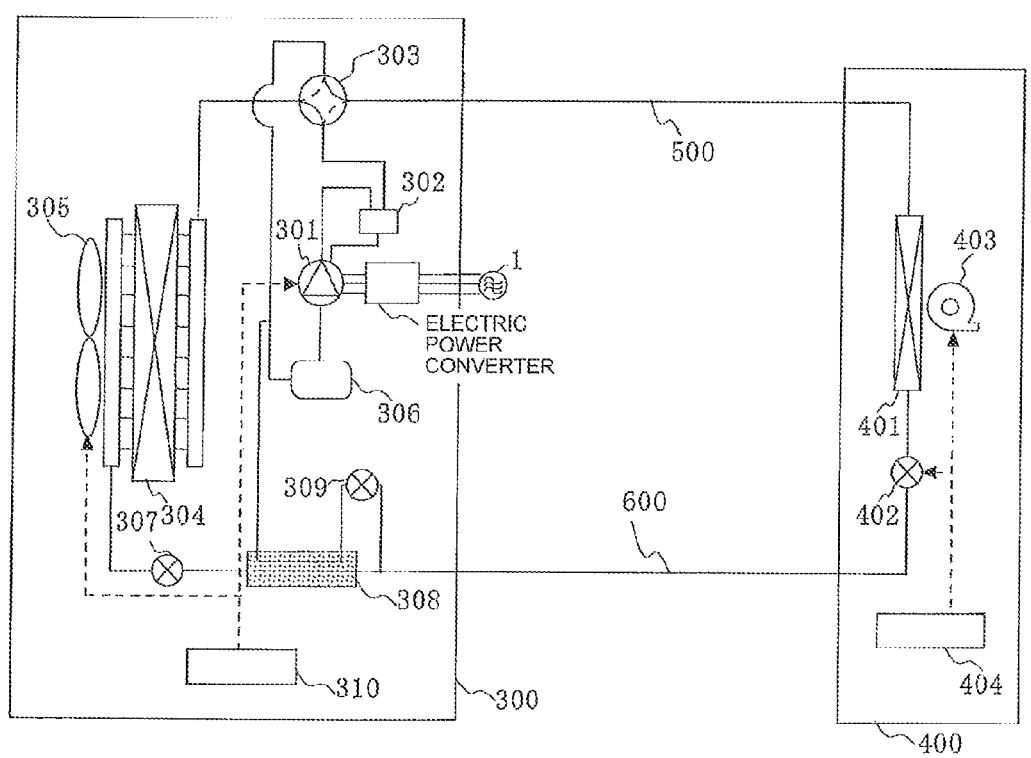
FIG. 20 is a configuration diagram of a refrigeration air-conditioning apparatus according to Embodiment 13 of the present invention.

FIG. 20 is a configuration diagram of a refrigeration air-conditioning apparatus according to Embodiment 13 of the present invention. In this embodiment, a description is given of a refrigeration air-conditioning apparatus to be supplied with electric power via the above-mentioned power converter. The refrigeration air-conditioning apparatus of FIG. 20 includes a heat source-side unit (outdoor unit) 300 and a load-side unit (indoor unit) 400. The heat source-side unit 300 and the load-side unit 400 are coupled to each other via refrigerant pipes, to thereby form a main refrigerant circuit to circulate refrigerant. In the refrigerant pipes, one pipe through which gas refrigerant flows is referred to as "gas pipe 500", and the other pipe through which liquid refrigerant (sometimes, two-phase gas-liquid refrigerant) flows is referred to as "liquid pipe 600".

In this embodiment, the heat source-side unit 300 includes respective devices (units), namely, a compressor 301, an oil separator 302, a four-way valve 303, a heat source-side heat exchanger 304, a heat source-side fan 305, an accumulator 306, a heat source-side expansion device (expansion valve) 307, an intermediate heat exchanger 308, a bypass expansion device 309, and a heat source-side controller 310.

The compressor 301 compresses and discharges the sucked refrigerant. In this case, the compressor 301 can arbitrarily change an operating frequency thereof so that the capacity of the compressor 301 (the amount of refrigerant sent per unit time) can be finely changed. Then, the power converter described above in each of the embodiments is mounted between the power source 1 for supplying electric power for driving the compressor 301 (motor) and the compressor 301 and other devices serving as the load 9.

The oil separator 302 separates lubricant oil which is mixed in the refrigerant and discharged from the compressor 301. The separated lubricant oil is returned to the compressor 301. The four-way valve 303 switches the flow of the refrigerant between a cooling operation and a heating operation based on an instruction from the heat source-side controller 310. Further, the heat source-side heat exchanger 304 exchanges heat between the refrigerant and the air (outside air). For example, in the heating operation, the heat source-side heat exchanger 304 functions as an evaporator, and exchanges heat between low-pressure refrigerant flowing into the heat source-side heat exchanger 304 via the heat source-side expansion device 307 and the air, to thereby evaporate and gasify the refrigerant. On the other hand, in the cooling operation, the heat source-side heat exchanger 304 functions as a condenser, and exchanges heat between refrigerant flowing into the heat source-side heat exchanger 304 from the four-way valve 303 side and compressed by the compressor 301 and the air, to thereby condense and liquefy the refrigerant. The heat source-side fan 305 is provided to the heat source-side heat exchanger 304 in order to efficiently exchange heat between the refrigerant and the air. The heat source-side fan 305 may also be supplied with electric power via the power converter described above in each of the embodiments, and, for example, an operating frequency of a fan motor may be arbitrarily changed by an inverter device serving as the load 9 so that the rotation speed of the fan may be finely changed.

The intermediate heat exchanger 308 exchanges heat between refrigerant flowing through a main passage of the refrigerant circuit and refrigerant branching from the passage to have the flow rate adjusted by the bypass expansion device 309 (expansion valve). In particular, when the refrigerant needs to be subcooled in the cooling operation, the intermediate heat exchanger 308 subcools the refrigerant and supplies the subcooled refrigerant to the load-side unit 400. Liquid flowing via the bypass expansion device 309 is returned to the accumulator 306 via a bypass pipe. The accumulator 306 is a unit for storing excess liquid refrigerant, for example. The heat source-side controller 310 is constructed with a microcomputer, for example. Then, the heat source-side controller 310 can communicate to and from the load-side controller 404 through wired or wireless connection, and, for example, based on data relating to detection by various kinds of detection units (sensors) included in the refrigeration air-conditioning apparatus, controls the respective devices (units) of the refrigeration air-conditioning apparatus, such as the control of the operating frequency of the compressor 301 by inverter circuit control, to thereby control the operation of the overall refrigeration air-conditioning apparatus. Further, the processing performed by the controller 100 described above in each of the embodiments may be performed by the heat source-side controller 310.

Besides, the load-side unit 400 includes a load-side heat exchanger 401, a load-side expansion device (expansion valve) 402, a load-side fan 403, and a load-side controller 404. The load-side heat exchanger 401 exchanges heat between the refrigerant and the air. For example, in the heating operation, the load-side heat exchanger 401 functions as a condenser, and exchanges heat between refrigerant flowing into the load-side heat exchanger 401 from the gas pipe 500 and the air, to thereby condense and liquefy the refrigerant (or turn the refrigerant into two-phase gas-liquid state), and discharges the refrigerant to the liquid pipe 600 side. On the other hand, in the cooling operation, the load-side heat exchanger 401 functions as an evaporator, and exchanges heat between refrigerant reduced in pressure by the load-side expansion device 402 and the air, to thereby cause the refrigerant to receive the heat of the air to evaporate and gasify the refrigerant, and discharge the refrigerant to the gas pipe 500 side. Further, the load-side fan 403 for adjusting the flow of the air subjected to heat exchange is provided to the load-side unit 400. The operating speed of the load-side fan 403 is determined based on user's setting, for example. The load-side expansion device 402 is provided in order to regulate the pressure of the refrigerant in the load-side heat exchanger 401 by being changed in opening degree.

Further, the load-side controller 404 is also constructed with a microcomputer, and can communicate to and from the heat source-side controller 310 through wired or wireless communication, for example. The load-side controller 404 controls the respective devices (units) of the load-side unit 400 based on an instruction from the heat source-side controller 310 or an instruction from a resident so that, for example, the indoor space may have a predetermined temperature. Further, the load-side controller 404 transmits a signal including data relating to detection by a detection unit provided to the load-side unit 400.

As described above, in the refrigeration air-conditioning apparatus according to Embodiment 13, the power converter according to each of the above-mentioned embodiments is used to supply electric power to the compressor 301, the heat source-side fan 305, and other devices. Consequently, the highly efficient, highly reliable, and power saving refrigeration air-conditioning apparatus can be obtained.

INDUSTRIAL APPLICABILITY

In Embodiment 13 described above, a description has been given of the case where the power converter according to the present invention is applied to a refrigeration air-conditioning apparatus, but the present invention is not limited thereto. The power converter according to the present invention is applicable also to a heat pump apparatus, an apparatus using a refrigeration cycle (heat pump cycle) such as a refrigerator, a conveyance apparatus such as an elevator, and a lighting apparatus (system).

REFERENCE SIGNS LIST 1 power source
1a single-phase AC power source
1b rectifying device
1c three-phase AC power source
2 boosting device
3 smoothing device
4 commutation device
5 voltage detection device
6 power source generation device
7 drive signal transmission device
8 commutation signal transmission device
9 load
10 current detection element
11 current detection device
21 magnetic energy storage unit
22 boost open/close switch unit
22 power change open/close switch unit
23 power change rectifier
23 boost rectifier
25 transformer
27 current interruption unit
41 transformer commutation rectifier
42a, 42b rectifier
43 transformer drive circuit
44, 44a, 44b commutation switch
45 transformer power source unit
46 transformer drive rectifier
47 transformer smoothing unit
48 current limiting unit
61 power source generation rectifier
62 power source generation smoothing unit
63 switching power source unit
100 controller
110 impedance detection unit
200 current detection unit
300 heat source-side unit
301 compressor
302 oil separator
303 four-way valve
304 heat source-side heat exchanger
305 heat source-side fan
306 accumulator
307 heat source-side expansion device
308 intermediate heat exchanger
309 bypass expansion device
310 heat source-side controller
400 load-side unit
401 load-side heat exchanger
402 load-side expansion device
403 load-side fan
404 load-side controller
500 gas pipe
600 liquid pipe

The invention claimed is:

1. A power converter for converting electric power between a power source and a load, comprising:
a voltage changing device including a rectifier configured to prevent a backflow of a current from a load to a power source, the voltage changing device being configured to change a voltage of electric power supplied from the power source to a predetermined voltage; and
a commutation device including
a commutation operation device configured to perform a commutation operation of directing a current flowing through the voltage changing device to an other path, and
a commutation rectifier including a plurality of rectifiers connected in series on the other path, the commutation rectifier being configured to rectify a current related to commutation, wherein
the commutation device includes a transformer configured to apply a voltage, induced by a current flowing through a primary-side winding of the transformer, to a secondary-side winding of the transformer on the other path, and
a turns ratio between the primary-side winding and the secondary-side winding of the transformer is adjusted so that the current generating a voltage causing reverse recovery of the rectifier flows through the commutation device while making a return current flowing on a side of the primary-side winding smaller than a current capacity of each element connecting to the primary winding, wherein
the transformer includes a reset winding provided to the primary-side winding.

2. The power converter of claim 1, wherein the transformer is a pulse transformer.

3. The power converter of claim 1, wherein the commutation device further includes a resistor on the other path, and the resistance value of the resistor is adjusted so that the current generating the voltage causing the reverse recovery of the rectifier flows through the commutation device.

4. The power converter of claim 1, wherein the commutation device includes a plurality of switching elements to be opened or closed for causing the commutation device to start or stop the commutation operation.

5. The power converter of claim 1, wherein the voltage changing device further includes a transformer unit, and applies a voltage for performing the commutation operation to the commutation device based on a voltage excited by the transformer unit.

6. The power converter of claim 1, wherein the voltage changing device further includes a reactor serving as a magnetic energy storage unit.

7. The power converter of claim 1,
wherein the voltage changing device further includes an open/close switch unit configured to change the voltage through switching, and
wherein the open/close switch unit includes an insulated gate bipolar transistor or a metal oxide semiconductor field effect transistor.

8. The power converter of claim 1,
wherein the commutation device includes
a switching element to be opened or closed for causing the commutation device to start or stop the commutation operation,
wherein the switching element includes an insulating unit configured to insulate a gate side and a drain (collector)-source (emitter) side from each other.

9. The power converter of claim 8, wherein the insulating unit includes a photocoupler or a pulse transformer.

10. The power converter of claim 1, further comprising:
a commutation power source unit configured to supply electric power for performing the commutation operation; and
a commutation smoothing unit configured to smooth the electric power supplied from the commutation amount power source unit.

11. The power converter of claim 1, further including a current detection unit configured to detect a current flowing through the commutation device.

12. The power converter of claim 11, wherein the current detection unit includes a current transformer or a resistor.

13. The power converter of claim 1, wherein the voltage changing device further includes a current interruption device configured to interrupt a current, the current interruption device being connected on a path of a current flowing from the power source to the side of the load.

14. The power converter of claim 1, wherein the commutation device includes a commutation rectification element for rectifying the current flowing through the other path.

15. The power converter of claim 14, wherein the commutation rectification element includes an element using a wide band-gap semiconductor.

16. The power converter of claim 15, wherein the wide band-gap semiconductor includes silicon carbide, a gallium nitride-based material, or diamond as a material of the wide band-gap semiconductor.

17. A refrigeration air-conditioning apparatus, including the power converter of claim 1 for driving at least one of a compressor and an air-sending device.

* * * * *